(12) United States Patent
Piedmonte et al.

(10) Patent No.: US 11,634,226 B1
(45) Date of Patent: Apr. 25, 2023

(54) MODULAR DELIVERY UNITS FOR USE IN AERIAL VEHICLES

(71) Applicant: Amazon Technologies, Inc., Seattle, WA (US)

(72) Inventors: Michael Daniel Piedmonte, Bothell, WA (US); Cyriel Notteboom, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 17/030,189

(22) Filed: Sep. 23, 2020

(51) Int. Cl.
*B64C 39/02* (2006.01)
*B64D 1/10* (2006.01)
*G06Q 30/0601* (2023.01)
*G06Q 10/087* (2023.01)

(52) U.S. Cl.
CPC .............. *B64C 39/024* (2013.01); *B64D 1/10* (2013.01); *G06Q 10/087* (2013.01); *G06Q 30/0633* (2013.01); *B64C 2201/027* (2013.01); *B64C 2201/128* (2013.01); *B64C 2211/00* (2013.01)

(58) Field of Classification Search
CPC ... B64D 1/00; B64D 1/02; B64D 1/08; B64D 1/10; B64D 1/12; B64C 2201/128; B64C 2211/00
See application file for complete search history.

(56) References Cited

U.S. PATENT DOCUMENTS

| 10,717,524 | B1* | 7/2020 | Boyes | B64C 27/08 |
| 2019/0051090 | A1* | 2/2019 | Goldberg | G07F 17/12 |
| 2019/0066032 | A1* | 2/2019 | Taveira | B65D 85/00 |
| 2019/0070995 | A1* | 3/2019 | Cantrell | B64F 1/222 |
| 2019/0263521 | A1* | 8/2019 | O'Brien | B64C 39/024 |
| 2022/0281601 | A1* | 9/2022 | Koperberg | B64D 1/02 |

FOREIGN PATENT DOCUMENTS

CN 111846202 A * 10/2020 ............. B64C 25/08

* cited by examiner

*Primary Examiner* — Joshua J Michener
*Assistant Examiner* — Arfan Y. Sinaki
(74) *Attorney, Agent, or Firm* — Athorus, PLLC

(57) ABSTRACT

Modular units having one or more bays or compartments are installed into openings of aerial vehicles that are sized and configured to accommodate the modular units. Multiple items may be loaded into the respective bays or compartments of the modular unit, which is installed into an opening of an aerial vehicle, and carried by the aerial vehicle to locations where the items are to be delivered. Hatches or coverings of the bays or compartments are selectively operated to deploy the items therefrom at the designated locations. A modular unit may be selected for use in a mission based on a number of bays or compartments therein, or any other features of the modular unit, and installed in any number of aerial vehicles having appropriately sized and configured openings.

18 Claims, 28 Drawing Sheets

INSTALL SINGLE MODULAR UNIT INTO CAVITY

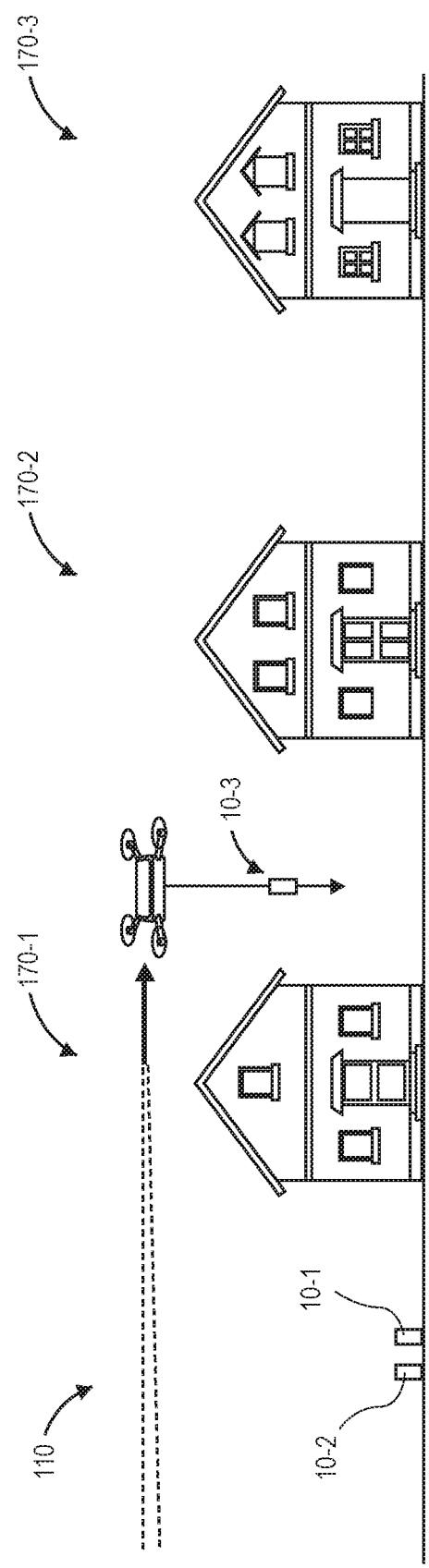

INSTALL SINGLE MODULAR UNIT
INTO CAVITY

ITEMS LOADED INTO MODULAR UNIT BY MERCHANT

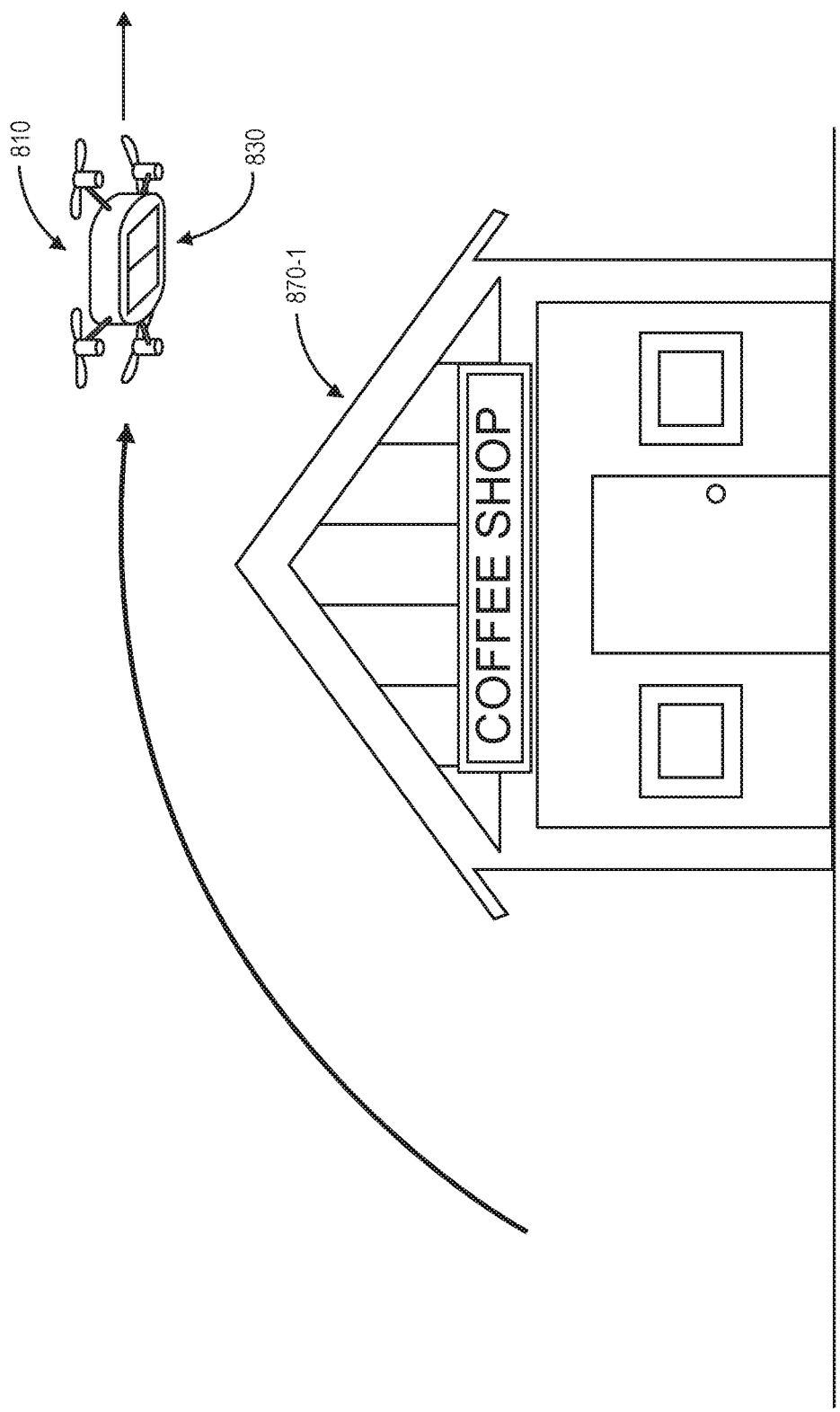

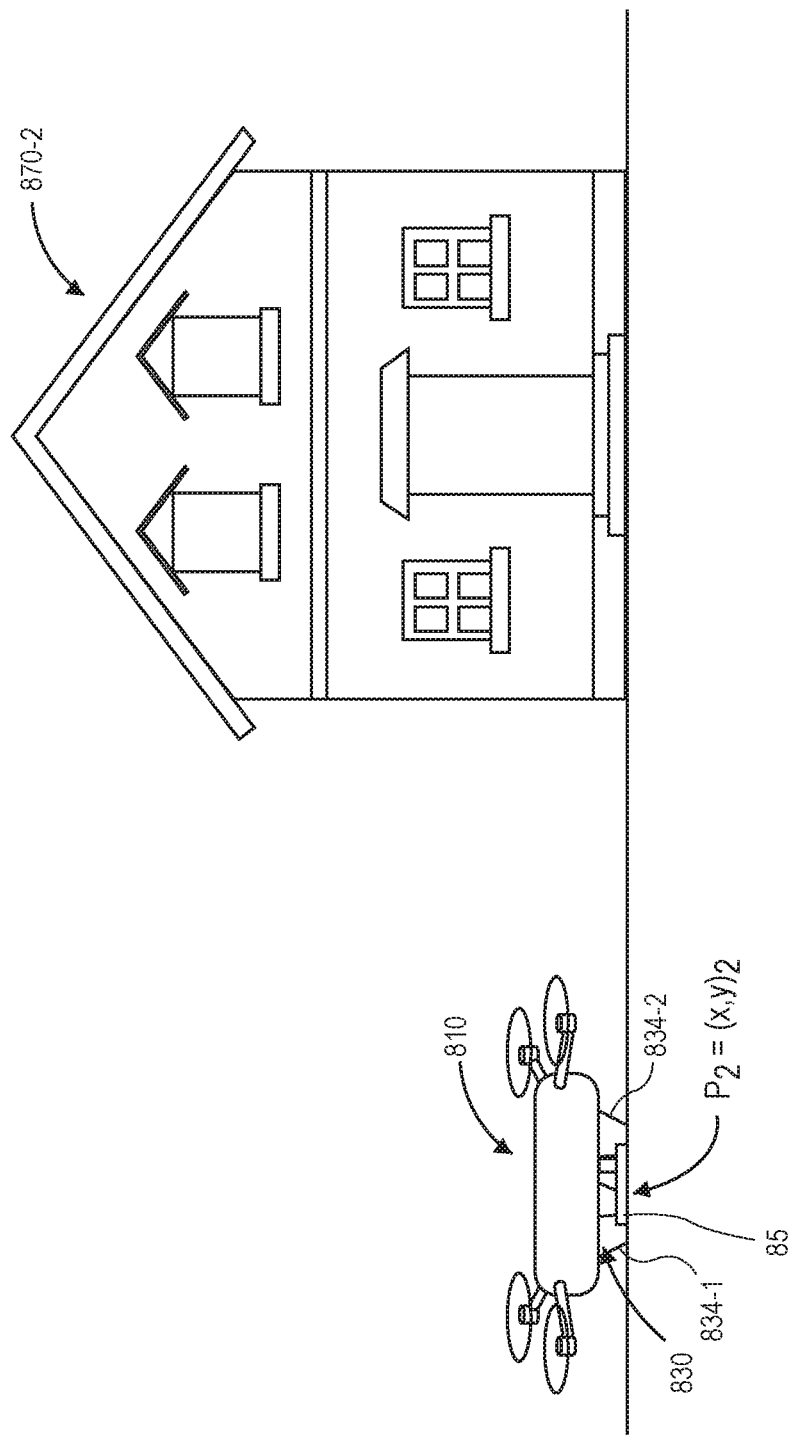

MODULAR DELIVERY UNITS FOR USE IN AERIAL VEHICLES

BACKGROUND

Aerial vehicles are used in an increasing number of applications, and are valued in many applications for their agility and ready maneuverability. An aerial vehicle is a valuable tool for completing deliveries of goods from one location to another location, or for performing one or more missions, especially where the aerial vehicle is outfitted or configured for both horizontal (or forward) and vertical flight, as well as hovering operations.

Designing and constructing aerial vehicles are expensive and arduous tasks. For example, an aerial vehicle is typically designed subject to one or more operational considerations, which may be selected or determined based on any requirements or restrictions of one or more applications for which the aerial vehicle is to be utilized. Additionally, before a newly designed aerial vehicle may conduct airborne flight operations, the aerial vehicle must undergo a number of testing evolutions in order to confirm that the design of the aerial vehicle is both safe and airworthy. For example, in many jurisdictions, a newly designed aerial vehicle's sizing, electrical and power plant specifications must be evaluated in order to demonstrate that the aerial vehicle may take off, operate aloft and land reliably. Thereafter, the aerial vehicle is constructed and tested in order to validate such specifications, and confirm that the aerial vehicle may be operated safely.

Processes for certifying an aerial vehicle as safe and airworthy are both slow and cautious in nature: a proposed aerial vehicle must be designed on paper, e.g., based on estimated loading conditions that may be expected during flight, and its specifications evaluated, before conducting testing on the various details, systems and subsystems of the proposed aerial vehicle, constructing the aerial vehicle, and subjecting the aerial vehicle to in-flight tests at various altitudes, attitudes and velocities. As a direct result, the number of new aerial vehicles that are certified and produced each year is typically low. Moreover, in many jurisdictions, substantial changes to a design of an aerial vehicle must be subject to the same or similar certifications as original designs.

BRIEF DESCRIPTION OF THE DRAWINGS

FIGS. 1A through 1H are views of aspects of one system including a modular unit for use in an aerial vehicle in accordance with embodiments of the present disclosure.

FIGS. 8A through 8G are views of one system including a modular unit for use in an aerial vehicle in accordance with embodiments of the present disclosure.

DETAILED DESCRIPTION

Figure 1B:
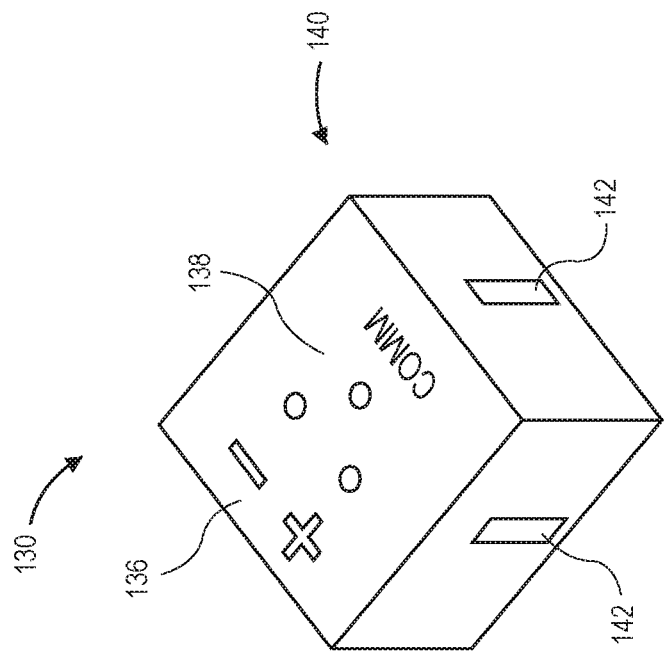

As is set forth in greater detail below, the present disclosure is directed to modular units for use in the performance of missions or other activities or functions by aerial vehicles, or methods for performing such missions. More specifically, some embodiments of the present disclosure include modular units that may be specifically configured for a mission, and installed aboard an aerial vehicle prior to the performance of the mission. The modular units may be designed and constructed with nominal or standard dimensions, and intended for installation into cavities or other openings within aerial vehicles that are sized and configured to accommodate the modular units, e.g., by providing electrical power, communications, hydraulics, or other services to the modular units. In this regard, a modular unit may fit into the same cavity or opening in multiple aircraft, as replaceable or substitutable components, without significantly impacting the aerodynamics or performance of the aircraft.

For example, in some embodiments, a modular unit may include any number of bays having discrete hatches, doors or other coverings that may be selectively operated, e.g., to enable the receipt or loading of one or more items therein, or to discharge or release one or more items therefrom. Each of the bays of a modular unit may be loaded with one or more items, and the modular unit may be installed into an appropriately sized and configured cavity or other opening of an aerial vehicle. Once the modular unit has been installed aboard the aerial vehicle, the aerial vehicle may complete deliveries of items to designated locations by selectively operating each of the hatches, doors or other coverings when the aerial vehicle hovers over or has landed at each of such locations. After the aerial vehicle has completed each of the deliveries, the modular unit may be removed from the aerial vehicle and the bays may be loaded again with one or more items before being reinstalled into the aerial vehicle, or into another aerial vehicle, to complete deliveries of such items to designated locations. Moreover, in some embodiments, multiple modular units may be installed into a cavity or another opening of an aerial vehicle. In still other embodiments, the modular unit may include a single bay, or one or more systems for maintaining an interior of the bay in a predetermined or desired condition.

A modular unit may be constructed with a frame, a body, a housing or another structure having a predetermined set of dimensions, e.g., a length, a height and a width, that may be accommodated in an opening of an aerial vehicle having a corresponding set of dimensions, e.g., a length, a height and a width that may accommodate the modular unit. The frame, the body, the housing or the other structure of the modular unit may accommodate any number of bays or other compartments therein. In some embodiments, the modular unit may be configured to maintain a temperature, a pressure, or any other attribute or metric of one or more bays or compartments at a desired level, above or below a desired threshold or set point, or within a desired range or band, e.g., with one or more temperature control systems such as heaters or refrigerators, one or more pressure control systems such as compressors or vents, one or more humidity control systems such as humidifiers or dehumidifiers, or one or more layers of insulation. Alternatively, in some embodiments, a modular unit may be equipped with cameras or other systems for capturing imaging data, wireless transceivers for transmitting information or data to or receiving information or data from one or more other devices or systems, or any other components, and may be utilized in missions that need not involve deliveries of one or more items.

Figure 1A:
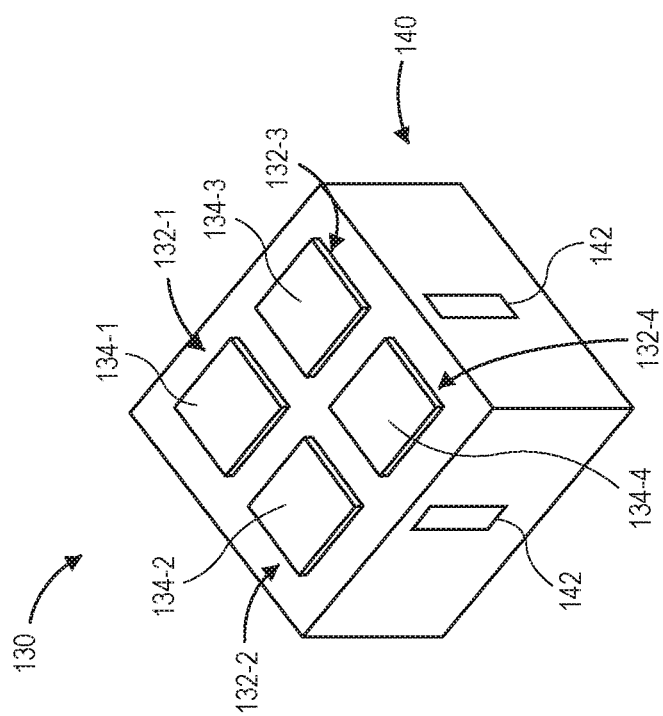

Referring to FIGS. 1A through 1H, views of aspects of one system including a modular unit for use in an aerial vehicle in accordance with embodiments of the present disclosure are shown. FIG. 1A is a bottom view of a modular unit 130, or a view of an underside of the modular unit 130. FIG. 1B is a top view of the modular unit 130, or a view of an upper side of the modular unit 130.

As is shown in FIGS. 1A and 1B, the modular unit 130 includes a plurality of bays 132-1, 132-2, 132-3, 132-4 provided within a frame (or body) 140. Each of the bays 132-1, 132-2, 132-3, 132-4 includes one of a plurality of hatches 134-1, 134-2, 134-3, 134-4 (or doors or other coverings) provided thereon. Each of the hatches 134-1, 134-2, 134-3, 134-4 may be independently operated, e.g., between an open position and a closed position, by one or more motors or other systems to enable or secure access to a respective one of the bays 132-1, 132-2, 132-3, 132-4. For example, each of the hatches 134-1, 134-2, 134-3, 134-4 may lift above, descend into, rotate away from or slide off of one of the bays 132-1, 132-2, 132-3, 132-4 to open or otherwise enable access to the one of the bays 132-1, 132-2, 132-3, 132-4, or move in an opposite or reciprocal manner to close or otherwise secure access to the one of the bays 132-1, 132-2, 132-3, 132-4.

The frame 140 is formed from one or more panels or sections and has a substantially rectangular shape (e.g., a rectangular hollow), such as a cuboid or parallelepiped. In some embodiments, such as is shown in FIG. 1A, the frame 140 includes a bottom panel or section (or base) and a plurality of sides or side sections extending substantially normal to the base. Each of the bays 132-1, 132-2, 132-3, 132-4 is accessible via the hatches 134-1, 134-2, 134-3, 134-4 which are provided in association with the bottom panel or section of the frame 140. Additionally, the frame 140 further includes one or more indents (or holes or openings) 142 on one or more of the sides of the frame 140. Such indents 142 may mate with one or more latches, hooks or other mechanical systems, or any electronic or magnetic (e.g., electromagnetic) features, within a cavity or other opening of an aerial vehicle, in order to maintain the modular unit 130 releasably secured therein. The frame 140 may have any dimensions. In some embodiments, the frame 140 may have a volume of approximately six inches (6") by nine inches (9") by sixteen inches (16"). In some other embodiments, however, the frame 140 may have any other dimensions, e.g., any lengths, heights or widths.

In some embodiments, each of the bays 132-1, 132-2, 132-3, 132-4 may have common dimensions, e.g., lengths, widths and/or heights, as well as cross-sectional areas, within the frame 140. For example, in some embodiments, the bays 132-1, 132-2, 132-3, 132-4 may extend in parallel within the frame 140, e.g., by common distances from the base of the frame 140, and may have internal volumes or capacities that are substantially equal to one another, e.g., to accommodate items of substantially identical sizes, or different sizes. In some other embodiments, however, two or more of the bays 132-1, 132-2, 132-3, 132-4 may have lengths, widths and/or heights, or cross-sectional areas, that are different from one another. For example, two or more of the bays 132-1, 132-2, 132-3, 132-4 may extend by different distances from the base of the frame 140, or may have different internal volumes or capacities, and may accommodate one or more items of different sizes. The hatches 134-1, 134-2, 134-3, 134-4 may be configured to entirely cover interior volumes of the bays 132-1, 132-2, 132-3, 132-4, enabling such interior volumes to be entirely isolated from an exterior of the modular unit 130. Alternatively, the hatches 134-1, 134-2, 134-3, 134-4 may be configured to only partially cover interior volumes of the bays 132-1, 132-2, 132-3, 132-4, enabling portions of interior volumes to be exposed to the exterior of the modular unit 130.

As is shown in FIG. 1B, the frame 140 includes a top panel or section (or cover) contacting or joined to each of the plurality of sides of the frame 140. The top panel or section includes a pair of electrical connectors 136 and a communications connector 138. When the modular unit 130 is inserted into a cavity or other opening of an aerial vehicle, the modular unit 130 may receive power from and/or engage in communications with a control system, a power source, or any other system within the aerial vehicle via the electrical connectors 136 and/or the communications connector 138. In some embodiments, the electrical connectors 136 and/or the communications connector 138 may be jacks, ports, sockets, modules or other systems for mating with cables, cords or other conductors of any kind, and may have male ends, female ends, flat ends, or any other components for forming connections with corresponding systems within a cavity or other opening of an aerial vehicle. The electrical connectors 136 and/or the communications connector 138 may be configured or equipped to transfer power, information or data at standard or nominal voltages or currents, or at customized or selected voltage or current levels. In some embodiments, the modular unit 130 may receive power or communicate with an aerial vehicle by a single connector, e.g., an Ethernet connection configured to provide power via Power over Ethernet, or any other connector, and need not include separate connectors 136, 138 for receiving power or for communication.

In some embodiments, the modular unit 130 may be self-powered, and need not include the electrical connectors 136. Likewise, in some embodiments, the modular unit 130 may communicate wirelessly with an aerial vehicle or other system, e.g., according to Bluetooth, Wireless Fidelity ("Wi-Fi"), or any other protocol, and need not include the communications connector 138. In such embodiments, the modular unit 130 may include any number of power sources (e.g., batteries, fuel cells, reactors, solar cells, or other sources), processors, memory components or data stores, or transceivers or other communications equipment (not shown) internal to the frame 140, or otherwise associated with the frame 140. For example, in some embodiments, the modular unit 130 may include one or more memory components or data stores programmed with one or more geo-locations to which the modular unit 130 is to be transported by an aerial vehicle, or any other information or data.

Figure 1C:
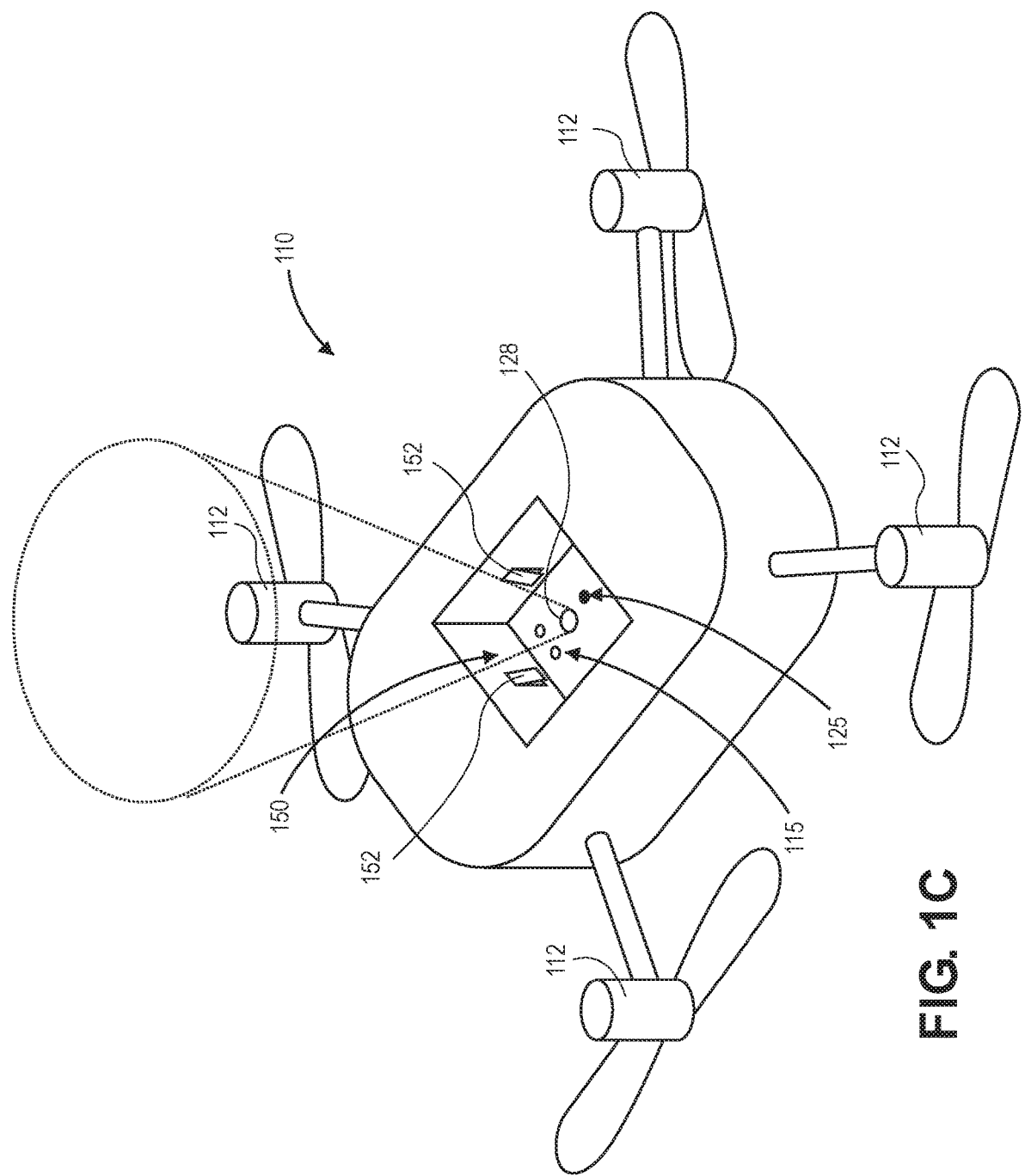

As is shown in FIG. 1C, an underside of an aerial vehicle 110 including a plurality of propulsion motors 112 joined to a body or frame by arms or struts is shown. The aerial vehicle 110 includes an opening 150 or cavity that is sized to accommodate the modular unit 130. The opening 150 is aligned at or in association with a center of mass of the aerial vehicle 110. Additionally, within the opening 150, which may be defined by a substantially horizontal surface and one or more vertical walls, a plurality of latches 152 are provided to engage with or disengage from the indents 142 of the modular unit 130, as shown in FIGS. 1A and 1B, when the modular unit 130 is to be installed or removed from the opening 150, respectively. On the substantially horizontal surface, the opening 150 includes electrical connectors 115 for coupling with the electrical connectors 136 of the modular unit 130, and a communications connector 125 for coupling with the communications connector 138 of the modular unit 130, to enable the modular unit to receive power from and communicate with the aerial vehicle 110. The opening 150 further includes one or more sensors 128, such as cameras or range sensors (e.g., radar, sonar or LIDAR ranging sensors), for detecting or monitoring the modular unit 130, or aligning or guiding the modular unit 130, during installation or removal within the opening 150.

Figure 1D:
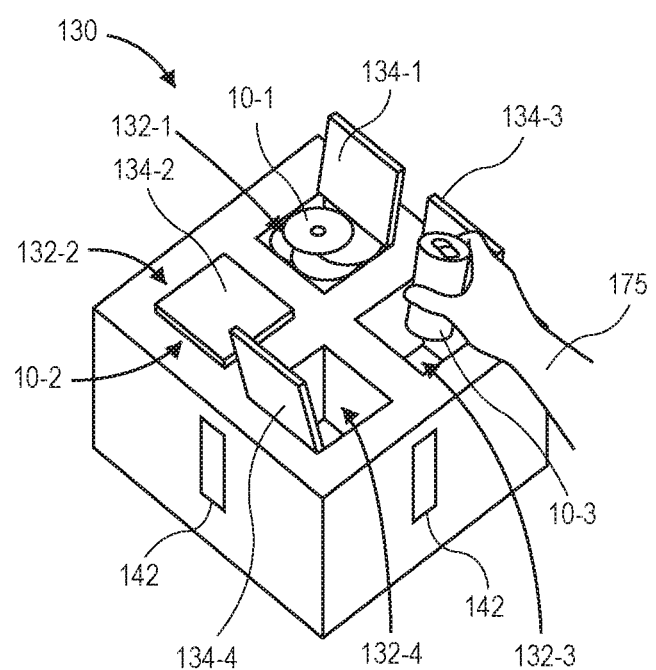

In accordance with embodiments of the present disclosure, a modular unit may be loaded with one or more sets of items that are intended for delivery to different destinations. As is shown in FIG. 1D, a worker 175 is loading the bays 132-1, 132-2, 132-3, 132-4 of the modular unit 130 with one or more sets of items. For example, the bay 132-1 is shown as containing an item 10-1, and the hatch 134-1 to the bay 132-1 is open. The item 10-1 may be any singular item, or block, group or cluster of items, that may be accommodated within the bay 132-1 without damaging contents of the item 10-1, either automatically or manually, e.g., by hand, by the worker 175. The bay 132-2 is shown as containing an item 10-2 (not shown) therein, and the hatch 134-2 is closed. The bay 132-3 is shown as being loaded with an item 10-3 by the worker 175, and the hatch 134-3 is open. The bay 132-4 is shown as empty, e.g., without any items therein, and the hatch 134-4 is open.

In some embodiments, the modular unit 130 or one or more of the bays 132-1, 132-2, 132-3, 132-4 may be specifically configured to receive a specific item or items therein, or a specific category of items therein, e.g., food products, pharmaceuticals, hardware, tools, computer products or accessories, or the like. In some embodiments, the modular unit 130 or the bays 132-1, 132-2, 132-3, 132-4 may be specifically configured to maintain one or more of the bays 132-1, 132-2, 132-3, 132-4 at a specific temperature, pressure or humidity level, above or below a specific temperature, pressure or humidity level, or within a range of temperature levels, pressure levels or humidity levels, or in any other predetermined or desired conditions.

Figure 1E:
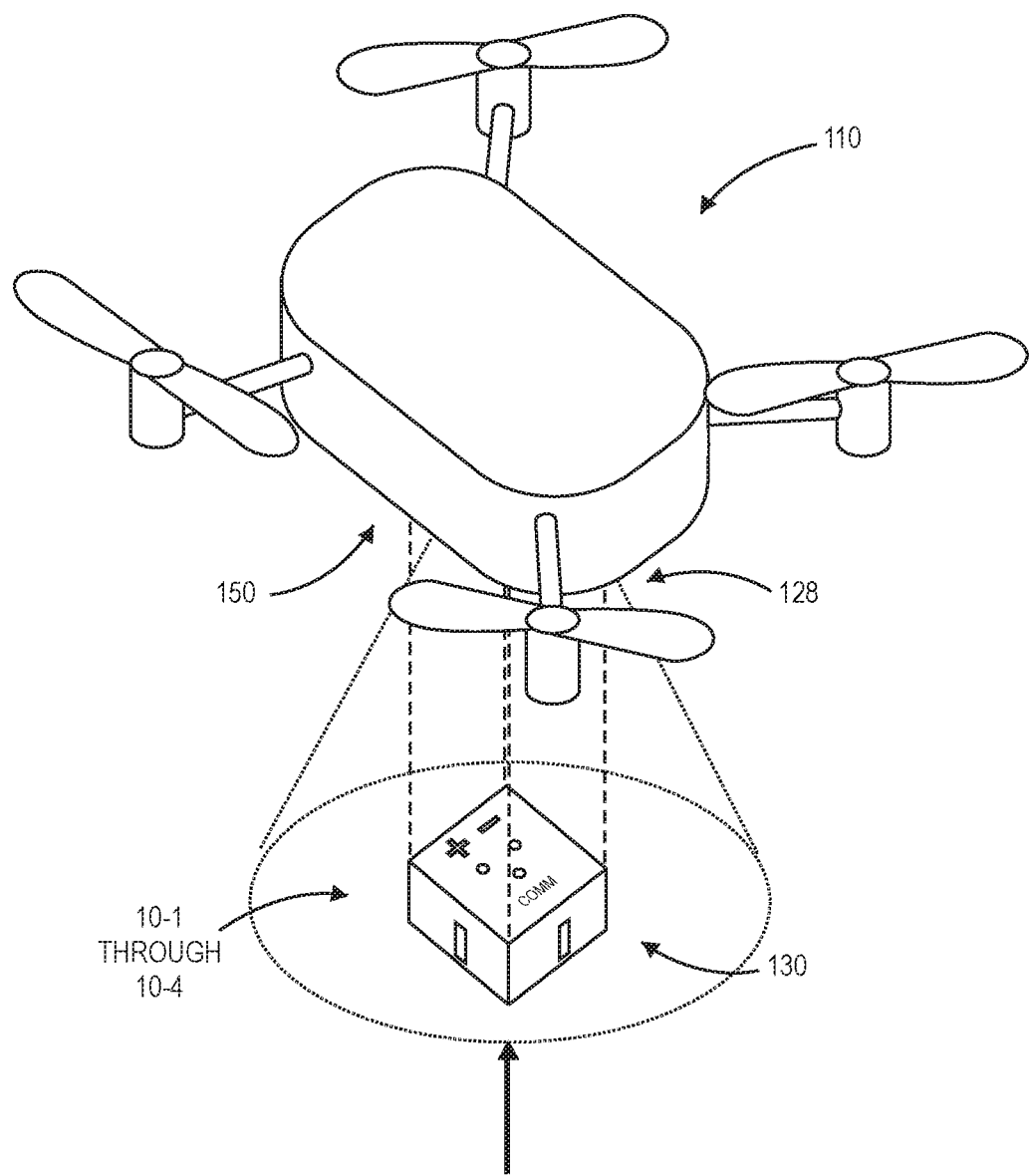

As is shown in FIG. 1E, once the modular unit 130 has been loaded with a plurality of items 10-1, 10-2, 10-3, 10-4, the modular unit 130 is installed within the opening 150, or is otherwise mounted or coupled to the aerial vehicle 110. In some embodiments, the modular unit may be manually installed, e.g., by insertion into the cavity or other opening, or automatically lifted, jacked, raised, pushed or urged into the cavity or other opening by one or more machines or other systems. The installation of the modular unit 130 into the opening 150 may be guided or aided based on data captured by the sensor 128.

In some embodiments, the modular unit 130 may be loaded with the items 10-1, 10-2, 10-3, 10-4 and installed within the opening 150 at a location associated with a fulfillment center, a materials handling facility, a warehouse, a merchant, a manufacturer, a vendor, a seller, or any other location. Alternatively, the modular unit 130 may be loaded with the items 10-1, 10-2, 10-3, 10-4 at two or more locations, and may be installed within the opening 150 at a location other than the location where the modular unit 130 was loaded with the items 10-1, 10-2, 10-3, 10-4.

Figure 1F:
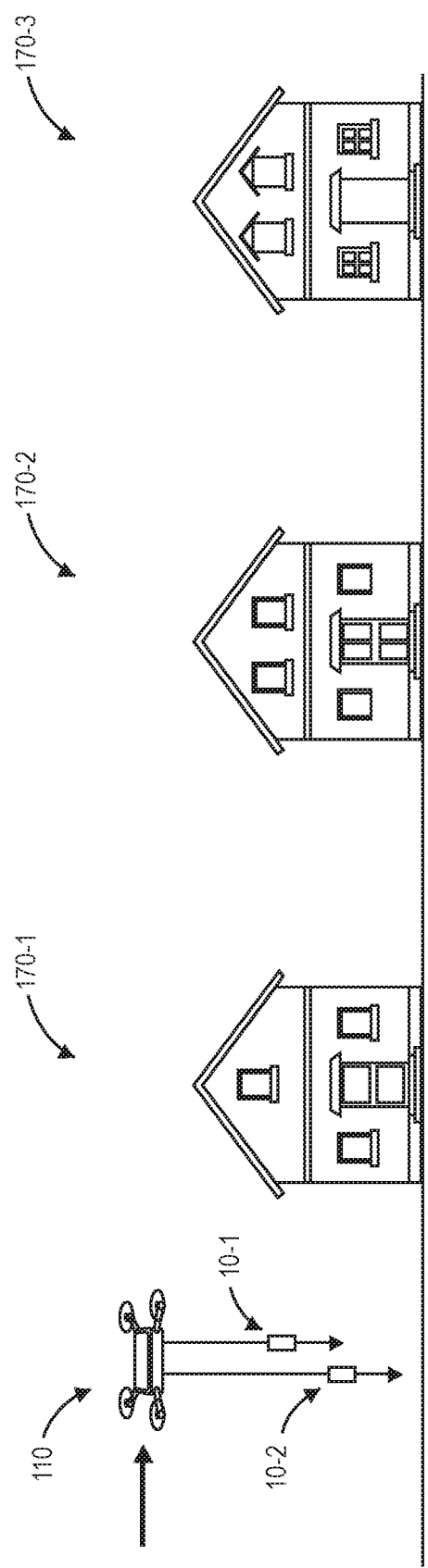

Once a modular unit that has been loaded with items intended for delivery to different locations is installed within an opening of an aerial vehicle, the items may be delivered to such locations. As is shown in FIG. 1F, the aerial vehicle 110 may deliver the items 10-1, 10-2, to a location associated with a home 170-1 (e.g., a house, an apartment building or another dwelling) or, alternatively, an office or other building, structure or lot. For example, the aerial vehicle 110 may be programmed with one or more geolocations, such as a set of geographic coordinates, and, optionally, an altitude identifying one or more points or locations associated with the home 170-1, and may operate the hatches 134-1, 134-2 to release the items 10-1, 10-2 upon arriving at or above the points or locations.

Figure 1H:
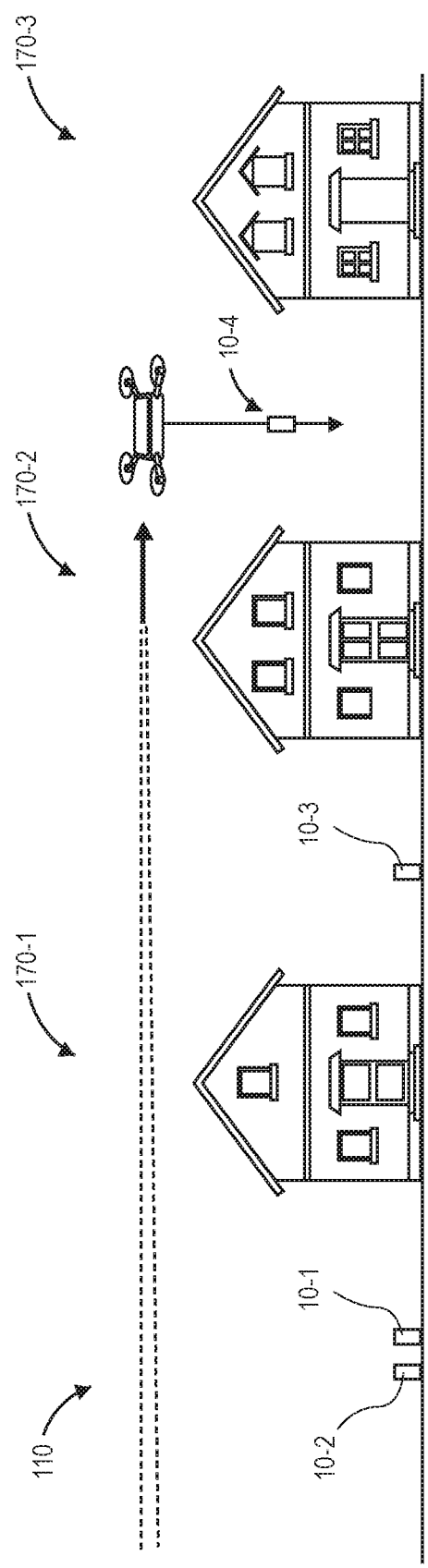

As is shown in FIG. 1G, after delivering the items 10-1, 10-2 to the location associated with the home 170-1, the aerial vehicle 110 may deliver the item 10-3 to a location associated with a home 170-2, e.g., by traveling to one or more points or locations associated with the home 170-2, and operating the hatch 134-3 to release the item 10-3 upon arriving at or above the points or locations. Likewise, as is shown in FIG. 1H, after delivering the item 10-3 to the location associated with the home 170-2, the aerial vehicle 110 may deliver the item 10-4 to a location associated with a home 170-3, e.g., by traveling to one or more points associated with the home 170-3, and operating the hatch 134-4 to release the item 10-4 upon arriving at or above the points or locations.

Upon completing the deliveries of the items 10-1, 10-2, 10-3, 10-4, the aerial vehicle 110 may return to a location at which the modular unit 130 was loaded with one or more of the items 10-1, 10-2, 10-3, 10-4, or may travel to a different location, where the modular unit 130 may be removed from the opening 150 of the aerial vehicle 110, loaded with one or more other items, and installed within the opening 150 of the aerial vehicle 110, or within an opening of another aerial vehicle having the same dimensions as the opening 150. Alternatively, the modular unit 130 may be replaced with another modular unit that has the same dimensions as the modular unit 130, and includes a plurality of bays that are loaded with one or more items (or sets of items) therein, or is otherwise configured to perform one or more missions, activities or other functions other than completing deliveries of items.

Figure 2:
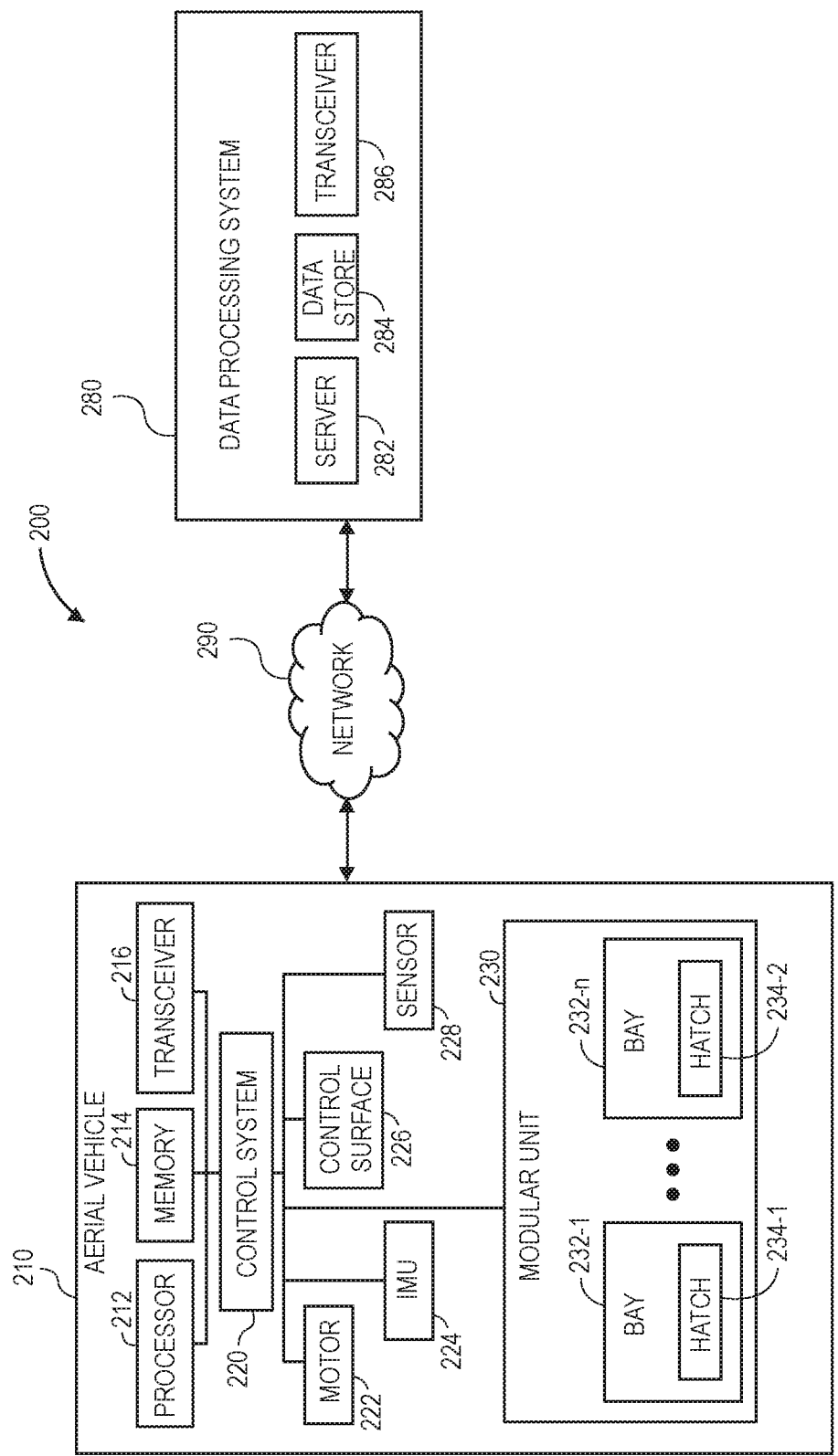
FIG. 2 is a block diagram of one system including a modular unit for use in an aerial vehicle in accordance with embodiments of the present disclosure.

Referring to FIG. 2, block diagrams of components of one system 200 for determining vehicle integrity in accordance with embodiments of the present disclosure is shown. The system 200 of FIG. 2 includes an aerial vehicle 210, a modular unit 230 and a data processing system 280 connected to one another over a network 290. Except where otherwise noted, reference numerals preceded by the number "2" shown in the block diagrams of FIG. 2 indicate components or features that are similar to components or features having reference numerals preceded by the number "1" shown in FIGS. 1A through 1H.

As is shown in FIG. 2, the aerial vehicle 210 includes a processor 212, a memory 214 and a transceiver 216. The aerial vehicle 210 further includes a control system 220, one or more propulsion motors 222, an inertial measurement unit 224, one or more control surfaces 226 and one or more sensors 228. As is also shown in FIG. 2, the control surface 220 is connected to or otherwise in communication with the modular unit 230, e.g., by one or more wired or wireless connections.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the motors 222, the inertial measurement unit 224, the control surfaces 226, the sensors 228 or the modular unit 230.

The processor 212 may also control the operation of one or more control systems or modules, such as the control system 220, for generating instructions for conducting operations of one or more of the propulsion motors 222, the inertial measurement unit 224, or the control surfaces 226, or for interpreting information or data captured by the sensors 228. The processor 212 may further control aspects of the operation of the modular unit 230. For example, the processor 212 may generate or execute one or more instructions for causing the operation of one or more latches, hooks or other mechanical systems, or any electronic or magnetic (e.g., electromagnetic) features, to secure the modular unit 230 within an opening of the aerial vehicle 210, or to release the modular unit 230 from the opening. Additionally, the processor 212 may execute one or more instructions for causing the operation of one or more hatches or other openings of bays within the modular unit 230, e.g., to enable the loading of items therein, or to enable the release of items therefrom. The processor 212 may communicate with the modular unit 230, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the motors 222, the inertial measurement unit 224, the control surfaces 226, the sensors 228, or the modular unit 230, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the motors 222, the inertial measurement unit 224, the control surfaces 226 or the sensors 228, or other components, such as to cause one or more of the motors 222 to rotate propellers at desired speeds or to cause such propellers to be aligned in selected positions or orientations. The control system 220 may further control any other aspects of the aerial vehicle 210, including but not limited to the operation of one or more aspects of the control surfaces 226, which may include wings, rudders, ailerons, elevators, flaps, brakes, slats or other features within desired ranges, or the enactment with or release of one or more items by one or more engagement systems (not shown). The control system 220 may also interpret data captured or signals generated by the inertial measurement unit 224, or the sensors 228. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the motors 222 may be a brushless DC multi-phase motor such as an outrunner brushless motor or an inrunner brushless motor.

The aerial vehicle 210 may include any number of motors 222 of any kind. For example, one or more of the motors 222 may be aligned or configured to provide forces of lift to the aerial vehicle 210, exclusively, while one or more of the motors 222 may be aligned or configured to provide forces of thrust to the aerial vehicle 210, exclusively. Alternatively, one or more of the motors 222 may be aligned or configured to provide forces of lift and forces of thrust to the aerial vehicle 210, as needed. For example, the motors 222 may be fixed in their orientation on the aerial vehicle 210, or configured to vary their respective orientations, e.g., a tilt-rotor aircraft. Moreover, the motors 222 may be aligned or configured to operate with different capacities or ratings, or at different speeds, or coupled to propellers having different sizes and shapes. For example, in some embodiments, one or more of the motors 222 may be an electric motor, e.g., a brushless DC multi-phase motor, and one or more of the motors 222 may be a gasoline-powered motor.

Each of the motors 222 may be coupled to one or more propellers (or rotors or rotatable systems) having a plurality of shaped blades joined to a hub or boss. For example, each of such propellers may be rotatably mounted to a mast or shaft associated with a respective one of the motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The inertial measurement unit 224 may be any type or form of onboard device for sensing changes in linear or rotational motion of the aerial vehicle 210. In some embodiments, the inertial measurement unit 224 may include one or more gyroscopes, one or more accelerometers, one or more compasses (or other magnetometer), and a Global Positioning System ("GPS") transceiver. In some embodiments, the inertial measurement unit 224 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other embodiments, however, the inertial measurement unit 224 may be strapped or mounted to an object suspended within the aerial vehicle 210.

Gyroscopes of the inertial measurement unit 224 may be any mechanical or electrical device, component, system, or instrument for determining an orientation, e.g., the orientation of the aerial vehicle 210. For example, the gyroscopes may be traditional mechanical gyroscopes, each having at least a pair of gimbals and a flywheel or rotor. Alternatively, the gyroscopes may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the aerial vehicle 210. In some embodiments, the gyroscopes may generate angular rate data in any direction or along or about any axis.

Accelerometers of the inertial measurement unit 224 may be any mechanical or electrical devices, components, systems, or instruments for sensing or measuring accelerations, including but not limited to devices having one or more potentiometers, linear variable differential transformers, variable reluctance devices or piezoelectric components. For example, in some embodiments, the accelerometers may be configured to capture acceleration data in any direction or along or about any axis, e.g., a triaxial accelerometer. The gyroscopes and/or the accelerometers of the inertial measurement unit 224 may be configured to generate angular rate data or acceleration data, respectively, at any rate or frequency, such as at frequencies ranging from zero to five hundred Hertz (0-500 Hz) or at frequencies greater than five hundred hertz (500 Hz).

Compasses of the inertial measurement unit 224 may be any devices, components, systems, or instruments adapted to determine one or more directions with respect to a frame of reference that is fixed with respect to the surface of the Earth (e.g., a pole thereof). For example, the compasses may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). GPS transceivers may be any devices, components, systems, or instruments adapted to receive signals (e.g., trilateration data or information) relating to a position of the inertial measurement unit 224 from one or more GPS satellites of a GPS network (not shown), or for reporting the position of the inertial measurement unit 224 determined based on such signals. Alternatively, the GPS transceivers may be any devices or components for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data). Geolocations of the GPS transceivers or the inertial measurement unit 224 may be associated with the aerial vehicle 210, where appropriate.

In some embodiments, the inertial measurement unit 224 may further include any number of computer components, e.g., one or more processors, memory components and/or transceivers (not shown), or any other components for aiding in the determination of accelerations, velocities, positions and/or orientations.

The control surfaces 226 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. In some embodiments, each of the control surfaces 226 may include a motor, such as an electrical, mechanical and/or hydraulic or other component or actuator for rotating, translating or otherwise repositioning or reorienting a respective one of the control surfaces 226 during operation of the aerial vehicle 210, under the control of the one or more processors 212 or the control system 220. In some embodiments, each of the control surfaces 226 may include a directional sensor, such as any type of sensor or other component that is embedded into one or more aspects of one of the control surfaces 226 (e.g., a leading edge, a trailing edge, a tip or one or more other faces or aspects of such surfaces 226) and configured to gather information or data with respect to an alignment or orientation thereof. For example, one of the control surfaces 226 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

The sensors 228 may be any devices, systems or components that are configured to capture data regarding the aerial vehicle 210, or its surroundings, as the aerial vehicle 210 is engaged in operations or testing, or at any other time. In some embodiments, the sensors 228 may include any number of sensors, e.g., a suite of such sensors, of any type or form. For example, the sensors 228 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 228 may be configured to capture or detect reflected light if the reflected light is within a field of view of the sensors 228, which is defined as a function of a distance between an imaging sensor and a lens within the sensors 228, viz., a focal length, as well as a position of the sensors 228 and an angular orientation of the lens. Accordingly, where an object appears within a depth of field, or a distance within the field of view where the clarity and focus is sufficiently sharp, the sensors 228 may capture light that is reflected off objects of any kind to a sufficiently high degree of resolution using one or more sensors thereof, and store information regarding the reflected light in one or more data files.

The sensors 228 may also include manual or automatic features for modifying a field of view or orientation. For example, the sensors 228 may be a digital camera configured in a fixed position, or with a fixed focal length (e.g., fixed-focus lenses) or angular orientation. Alternatively, the sensors 228 may include one or more actuated or motorized features for adjusting a position of the sensors 228, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 228, or a change in one or more of the angles defining the angular orientation of the sensors 228.

For example, the sensors 228 may be an imaging device that is hard-mounted to the aerial vehicle 210 in a fixed configuration or angle with respect to one, two or three axes. Alternatively, however, the sensors 228 may be provided with one or more motors and/or controllers for manually or automatically operating one or more of the components, or for reorienting the axis or direction of the sensors 228, i.e., by panning or tilting the sensors 228. Panning the sensors 228 may cause a rotation within a horizontal plane or about a vertical axis (e.g., a yaw), while tilting the sensors 228 may cause a rotation within a vertical plane or about a horizontal axis (e.g., a pitch). Additionally, the sensors 228 may be rolled, or rotated about its axis of rotation, and within a plane that is perpendicular to the axis of rotation and substantially parallel to a field of view of the sensors 228.

Imaging data (e.g., still or moving images, as well as associated audio data or metadata) captured using the sensors 228 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 228 may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 228 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 228, may be derived, and the net vector may include any other values associated with information or data captured by any of the sensors 228, e.g., images, sounds, or the like. Additionally, coefficients or scalars indicative of the relative movements of the aerial vehicle 210 may also be defined.

The modular unit 230 is any structure that is configured to be installed within or otherwise mounted or coupled to the aerial vehicle 210, and is specifically constructed to aid in the performance of one or more missions, activities or functions of the aerial vehicle 210, including but not limited to the completion of deliveries to one or more locations. As is shown in FIG. 2, the modular unit 230 includes a plurality of bays 232-1 . . . 232-$n$, and each of the plurality of bays 232-1 . . . 232-$n$ includes one of a plurality of hatches 234-1 . . . 234-$n$ for enabling or restricting access to one of the bays 232-1 . . . 232-$n$.

The modular unit 230 may be constructed with a frame (or a body, a housing or another structure) having a predetermined set of dimensions, e.g., a length, a height and a width, that may be accommodated in an opening of the aerial vehicle 210 having a corresponding set of dimensions, e.g., a length, a height and a width that may accommodate the modular unit 230. The frame may be defined by any panels, sections, faces or surfaces, which may be flat (e.g., panels, sections, faces or surfaces aligned horizontally, vertically, or at any other angle with respect to one another) or curved, and may have any shape. For example, a frame of the modular unit 230 may have a substantially rectangular shape (e.g., a rectangular hollow), such as a cuboid or parallelepiped, having one or more substantially horizontal panels, sections, faces or surfaces, and a plurality of sides extending substantially normal to the panels, sections, faces or surfaces. Alternatively, the modular unit 230 may have a frame with any other shape, including but not limited to a cylinder, a triangular prism, or any other shape. Moreover, a frame of the modular unit 230 may include any number of external features for enabling the modular unit 230 to be releasably installed within or removed from an opening of the aerial vehicle 210, e.g., latches, hooks or other mechanical systems, or any electronic or magnetic features.

In some embodiments, the modular unit 230 may further include any number of other external features for enabling the modular unit 230 to receive power from or communicate with the aerial vehicle 210, such as jacks, ports, sockets, modules or other systems. Alternatively, in some other embodiments, the modular unit 230 may include any number of power sources (e.g., batteries, fuel cells, reactors, solar cells, or other sources), processors, memory components or data stores, or transceivers or other communications equipment (not shown). For example, in some embodiments, the modular unit 230 or the memory 214 may include information or data identifying the one or more items disposed within the respective ones of the bays 232-1 . . . 232-$n$, or any other information or data regarding such items, including but not limited to geolocations at or above which the one or more items disposed therein are to be deployed or otherwise released therefrom, or any other information or data.

In some embodiments, the modular unit 230 may be formed from plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., aluminum or aluminum alloys, machined aluminum, or metals other than aluminum, such as steels), composites or any other combinations of materials. The frames may be formed by extrusion (e.g., hot or cold), rolling, forging, drawing, bending or shearing, or any other processes, such as injection molding, or any other form of forming or molding (e.g., rotational molding, extrusion molding, vacuum casting, thermoforming, compression molding).

The bays 232-1 . . . 232-$n$ may be discrete compartments provided within a frame of the modular unit 230. In some embodiments, each of the bays 232-1 . . . 232-$n$ may have lengths, widths and/or heights, or cross-sectional areas, that are equal to one another. For example, the bays 232-1 . . . 232-$n$ may have shapes in the form of rectangular hollows, cylinders, triangular prisms, or any other shapes, with common dimensions or internal volumes. In some other embodiments, however, two or more of the bays 232-1 . . . 232-$n$ may have lengths, widths and/or heights, or cross-sectional areas, that are different from one another. For example, two or more of the bays 232-1 . . . 232-$n$ may have the same shape, or different shapes, and such shapes may have different dimensions or internal volumes. Moreover, the bays 232-1 . . . 232-$n$ may be sized, shaped or configured to receive, transport, and deliver items or containers of any size or shape, including but not limited to items within envelopes, bags, tubes, boxes, or other containers, or items that are not maintained in any containers.

The hatches 234-1 . . . 234-$n$ may be any systems, such as doors or other coverings, that may be selectively operated (e.g., moved) to enable or restrict access to respective ones of the bays 232-1 . . . 232-$n$, such as to enable items to be loaded into the bays 232-1 . . . 232-$n$, or released from the bays 232-1 . . . 232-$n$. The hatches 234-1 . . . 234-$n$ may be configured to rotate, slide, be raised or lowered, or repositioned in any manner within a range between an open position and a closed position with respect to the bays 232-1 . . . 232-$n$. In some embodiments, the hatches 234-1 . . . 234-$n$ may be selectively operated using one or more servo motors, induction motors, or any other systems, in communication with the control system 220 or one or more other computer devices or systems. Moreover, the bays 232-1 . . . 232-$n$ and the hatches 234-1 . . . 234-$n$ may be formed from any materials, such as one or more materials from which a frame or one or more panels, sections, faces or surfaces of the modular unit 230 is formed, or any other suitable materials.

In some embodiments, the modular unit 230 may further include one or more systems for receiving or deploying items from one or more of the bays 232-1 . . . 232-$n$. For example, the modular unit 230 or any number of the bays 232-1 . . . 232-$n$ may include one or more tethers, winches, decelerators, or other components, which may be controlled or operated by one or more motors or other systems, or in any other manner. In some embodiments, in order to load or receive one or more items therein, the modular unit 230 and/or one or more of the bays 232-1 . . . 232-$n$ may operate such components to engage with the one or more items and draw or retract the one or more items into a corresponding one of the bays 232-1 . . . 232-$n$. Alternatively, the one or more items may be manually or automatically loaded into corresponding ones of the bays 232-1 . . . 232-$n$ in any other manner. In some embodiments, in order to release or deploy one or more items therefrom, the modular unit 230 and/or one or more of the bays 232-1 . . . 232-$n$ may operate such components to eject, discharge or otherwise release the items therefrom. Alternatively, in some embodiments, the modular unit 230 may be configured to permit the one or more items to naturally descend from the bays 232-1 . . . 232-$n$ by operation (e.g., opening) of corresponding ones of the hatches 234-1 . . . 234-$n$.

In some embodiments, the modular unit 230 need not include any bays or hatches. For example, where the modular unit 230 includes one or more components associated with performance of a specific mission, activity or function, e.g., a camera for capturing imaging data, a router and/or transceiver for providing access to the network 290 to ground-based or airborne systems, or any other components (such as sensors, processors, memory components or data stores, or any other equipment or features), the modular unit 230 may be installed into a cavity or other opening of the aerial vehicle 210 and transported to one or more locations where the mission, the activity or the function is to be performed. Subsequently, the modular unit 230 may be removed from the opening of the aerial vehicle 210 and replaced by another modular unit 230, which may be configured to perform the same mission, activity or function, or a different mission, activity or function.

In some embodiments, the modular unit 230 and/or the bays 232-1 . . . 232-$n$ may include one or more systems for maintaining a temperature, a pressure or a humidity level within one or more of the bays 232-1 . . . 232-$n$ at a predetermined or selected level, above or below a predetermined or selected set point, or within a predetermined or selected range or band. For example, the modular unit 230 may include one or more heaters, chillers, fans, compressors, vents, humidifiers, dehumidifiers, or any other systems for determining or regulating a temperature, a pressure or a humidity level within one or more of the bays 232-1 . . . 232-*n*.

Although the aerial vehicle 210 shown in the block diagram of FIG. 2 includes a single box for a motor 222, a single box for an inertial measurement unit 224, a single box for a control surface 226, a single box for a sensor 228, and a single box for a modular unit 230, those of ordinary skill in the pertinent arts will recognize that any number or type of motors, inertial measurement units (or components thereof), control surfaces, sensors or modular units may be provided aboard or in association with the aerial vehicle 210 in accordance with the present disclosure. Alternatively, in some embodiments, the aerial vehicle 210 may be a ground vehicle or any other object. The systems and methods of the present disclosure are not limited for use in connection with aerial vehicles. Similarly, although the modular unit 230 shown in the block diagram of FIG. 2 includes a pair of boxes for bays 232-1 . . . 232-*n*, and a pair of boxes for hatches 234-1 . . . 234-*n*, those of ordinary skill in the pertinent arts will recognize that the modular unit 230 may include any number of bays 232-1 . . . 232-*n* and hatches 234-1 . . . 234-*n* in accordance with the present disclosure.

As is shown in FIG. 2, the data processing system 280 includes one or more physical computer servers 282 having one or more data stores 284 and one or more transceivers 286 associated therewith, and may be provided for any specific or general purpose. For example, the data processing system 280 of FIG. 2 may be independently provided for the exclusive purpose of receiving, analyzing or storing information or data received from the aerial vehicle 210 or the modular unit 230, including but not limited to forces, torques, frequencies, power levels, times and/or other sets of data regarding the inertial or vibratory response to one or more maneuvers or other manipulations. Alternatively, the data processing system 280 of FIG. 2 may be provided in connection with one or more physical or virtual services configured to receive, analyze or store such information or data, as well as one or more other functions.

In some embodiments, the data processing system 280 may be configured to program the modular unit 230 to engage with the aerial vehicle 210, to receive items within one or more bays 232-1 . . . 232-*n*, or to release the items from the one or more bays 232-1 . . . 232-*n* at a predetermined or selected time, or at or above a predetermined or selected location. In some embodiments, the data processing system 280 may be configured to process data captured by the sensors 228. Alternatively, or additionally, the data processing system 280 may be configured to execute any other function associated with the operation of the aerial vehicle 210 or the modular unit 230.

The servers 282 may be connected to or otherwise communicate with the data stores 284 and the transceiver 286. The data stores 284 may store any type of information or data, including but not limited to information or data received from the aerial vehicle 210, for any purpose. The transceiver 286 may share any of the features, properties or attributes of the transceiver 216 described above, or may have one or more different features, properties or attributes. The servers 282 and/or the transceiver 286 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location, e.g., a location associated with a materials handling facility, a fulfillment center, a warehouse, or any other location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the modular unit 230 or the data processing system 280 may use any web-enabled or Internet applications or features, or any other client-server applications or features including E-mail or other messaging techniques, to connect to the network 290, or to communicate with one another. For example, the aerial vehicle 210 and/or the modular unit 230 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the modular unit 230 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the server 282, or any other computers or control systems utilized by the aerial vehicle 210, the modular unit 230 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, a modular unit may be loaded with one or more items within each of a plurality of bays and installed into a vehicle (e.g., a UAV, or a drone). The aerial vehicle may then transport the modular unit to any of a plurality of locations to which the items are to be delivered, and release or deploy the items at or above such locations.

Figure 3:
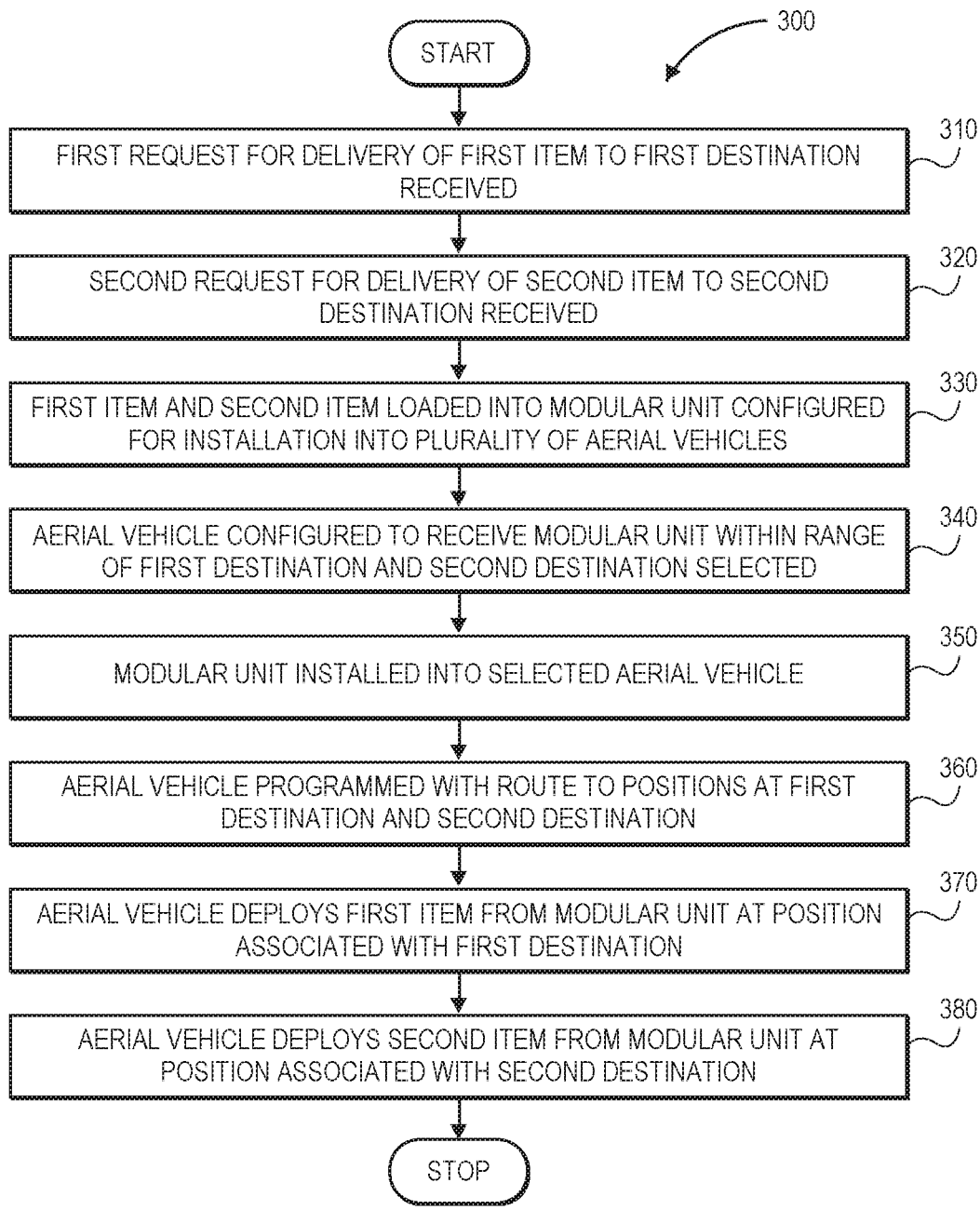
FIG. 3 is a flow chart of one process performed by an aerial vehicle including a modular unit in accordance with embodiments of the present disclosure.

Referring to FIG. 3, a flow chart 300 of one process for performing missions using aerial vehicles and modular units in accordance with embodiments of the present disclosure is shown. At box 310, a first request for a delivery of a first item to a first destination is received. For example, the first request may be received via one or more network sites (e.g., web sites) associated with an electronic marketplace, or via an application associated with the electronic marketplace that operates on one or more computer devices (e.g., mobile devices). Alternatively, the first request may be made by telephone, in person, e.g., at a bricks-and-mortar retail establishment, or in any other manner. The first request may identify a customer or other intended recipient of the first item, as well as a geolocation associated with the first destination, or include any other identifier.

At box 320, a second request for a delivery of a second item to a second destination is received. In some embodiments, the second request may be related to the first request, or may be received in the same manner or at the same time as the first request. For example, a single order executed via one or more network sites or an application may include both the first request, e.g., a request to deliver at least the first item to the first destination, and also the second request, e.g., a request to deliver at least the second item to the second destination. Alternatively, in some embodiments, the second request may be unrelated to the first request, or may be received in any other manner or at any other time. For example, where the first request and the second request are received in different orders, a data processing system associated with an electronic marketplace may determine one or more associations between the first request and the second request, the first item and the second item, or the first destination and the second destination.

At box 330, the first item and the second item are loaded into a modular unit that is configured for installation into a plurality of aerial vehicles. For example, where the first item and the second item are located in a common location, e.g., at a materials handling facility, a fulfillment center, a warehouse, or in any other location, the first item and the second item may be loaded automatically or by hand into discrete bays or other compartments of the modular unit in any order. Alternatively, the first item may be loaded into one bay of the modular unit at one location, and the modular unit may be transported to another location, where the second item may be loaded into another bay of the modular unit. The bays or other compartments into which the first item and the second item are loaded may be selected on any basis, including but not limited to the sizes or shapes of the first item and the second item, or the operational capabilities of such bays or compartments, and the extent to which such bays or compartments may maintain the first item and the second item in a desired condition, e.g., a selected temperature or pressure, or range of temperatures or pressures, or any other condition. The modular unit may be sized and shaped for insertion into a cavity or another opening of the aerial vehicles having a corresponding size and shape, and may be adapted to receive electrical power, communications, hydraulics, or other services from the aerial vehicle within the cavity or other opening.

At box 340, an aerial vehicle that is configured to receive the modular unit and is within range of the first destination and the second destination is selected. The aerial vehicle may be selected on any basis, including a power level, speed rating, carrying capacity, readiness status of the aerial vehicle, or any other basis. Alternatively, in some embodiments, the aerial vehicle may be selected based on any current or follow-on tasking of the aerial vehicle preceding or following times at which the first item and the second item are to be delivered.

At box 350, the modular unit is installed into the aerial vehicle selected at box 340. For example, the modular unit may be manually installed, e.g., by insertion into the cavity or other opening, or automatically lifted, jacked, raised, pushed or urged into the cavity or other opening by one or more machines or other systems. Alternatively, the modular unit may be automatically installed, e.g., by such as by one or more elevator platforms, robotic arms, or other systems. The aerial vehicle may further include one or more sensors of any type or form for detecting one or more aspects of the modular unit, or for guiding the modular unit into the cavity or other opening, e.g., cameras or range sensors. Moreover, the modular unit may be secured within the cavity or other opening by one or more latches, hooks or other mechanical systems, or any electronic or magnetic (e.g., electromagnetic) features. Furthermore, when the modular unit is installed into the aerial vehicle, the modular unit may mate with one or more electrical contacts or communications connections within the cavity or other opening, or otherwise enable the modular unit to receive any other services from the aerial vehicle. Alternatively, the modular unit may be self-powered, e.g., by one or more batteries, fuel cells, reactors, solar cells, or other sources, or may communicate wirelessly with the aerial vehicle or any other systems.

At box 360, the aerial vehicle is programmed with one or more routes to positions at the first destination and the second destination. In some embodiments, the aerial vehicle may receive one or more sets of instructions or other information or data defining a route having one or more paths to geolocations of the positions at the first destination and the second destination, as well as locations of ground-based terrain or other features, or permissive or restricted zones over which the aerial vehicle may or may not travel. The aerial vehicle may receive the one or more sets of instructions wirelessly or via a wired connection with one or more external systems, or in any other manner. For example, in some embodiments, the sets of instructions may be programmed onto a memory component or data store provided in association with the modular unit. Upon installing the modular unit into the cavity or other opening of the aerial vehicle, the sets of instructions may be transferred from the modular unit to a data store or memory component of the aerial vehicle.

At box 370, the aerial vehicle deploys the first item from the modular unit at a position associated with the first destination. For example, the aerial vehicle may travel from a location at which the modular unit is installed into the aerial vehicle to a position associated with the first destination, and may deploy or otherwise release the first item as the aerial vehicle lands at or hovers over the position. The first item may be deployed in any manner, such as by operating a hatch, a door or another covering of a bay within which the first item is stored, and the first item may be permitted to descend or depart from the bay in a tethered or untethered manner.

At box 380, the aerial vehicle deploys the second item from the modular unit at a position associated with the second destination, and the process ends. For example, the aerial vehicle may travel from the position associated with the first destination at or over which the first item was deployed to a position associated with the second destination. Upon arriving at the position associated with the second destination, the aerial vehicle may deploy the second item in any manner, such as by operating a hatch, a door or another covering of a bay within which the second item is stored, and the second item may be permitted to descend or depart from the bay in a tethered or untethered manner. After deploying the second item, the aerial vehicle may return to a location of the materials handling facility, the fulfillment center, the warehouse, or the other location at which one or both of the first item and the second item were loaded into the modular unit, or at which the modular unit was loaded into the aerial vehicle, or may travel to any other location, and may undertake or perform any other mission.

Although the flow chart 300 of FIG. 3 references requests for a first item and a second item, and loading the first item and the second item into a modular unit, those of ordinary skill in the pertinent arts will recognize that any number of items may be loaded into any number of bays of the modular unit, subject to the operational capacities of the modular unit, and that an aerial vehicle into which the modular unit is installed may complete any number of deliveries of such items in accordance with embodiments of the present disclosure.

Figure 4A:
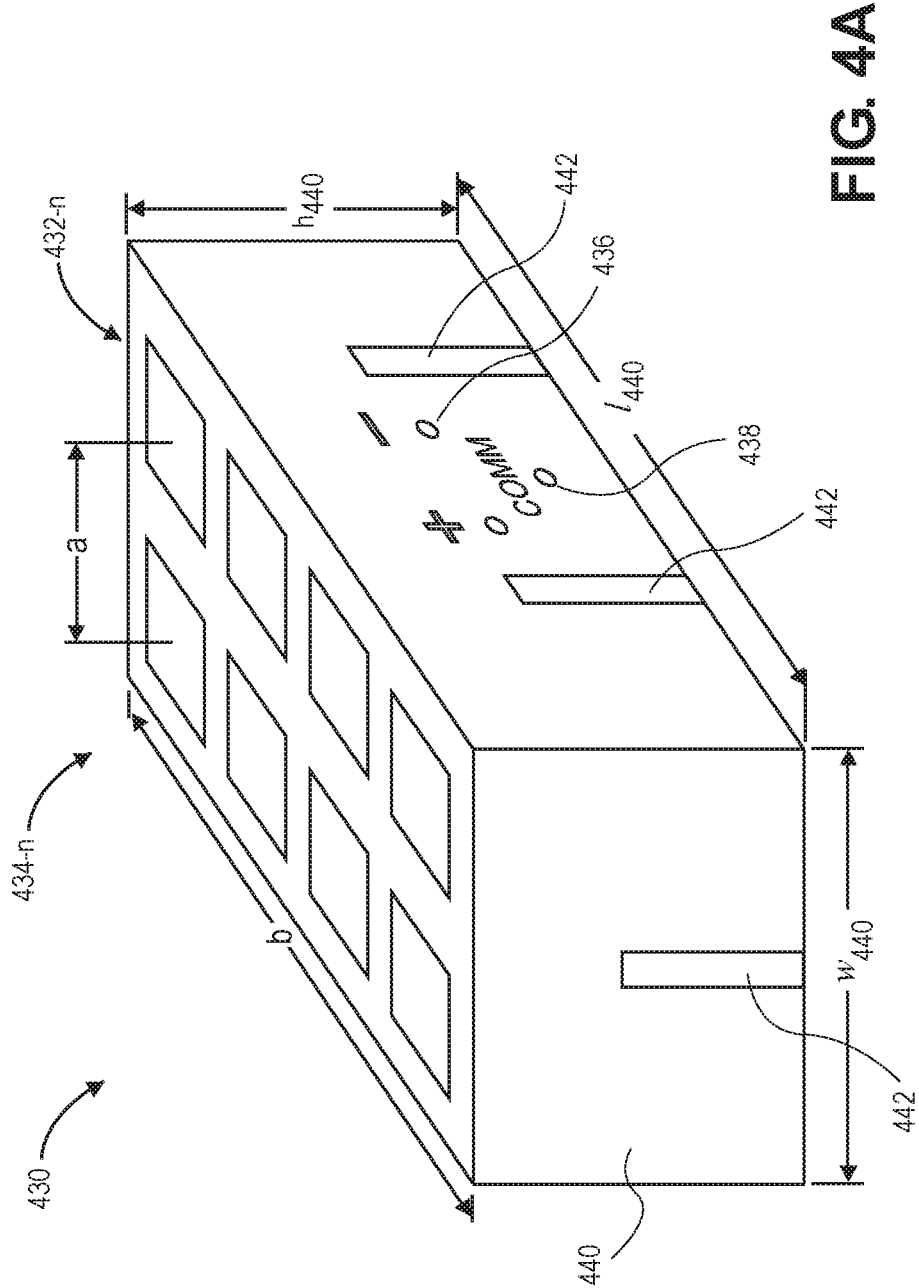
FIGS. 4A through 4C are views of one modular unit for use in an aerial vehicle in accordance with embodiments of the present disclosure.
Figure 4B:
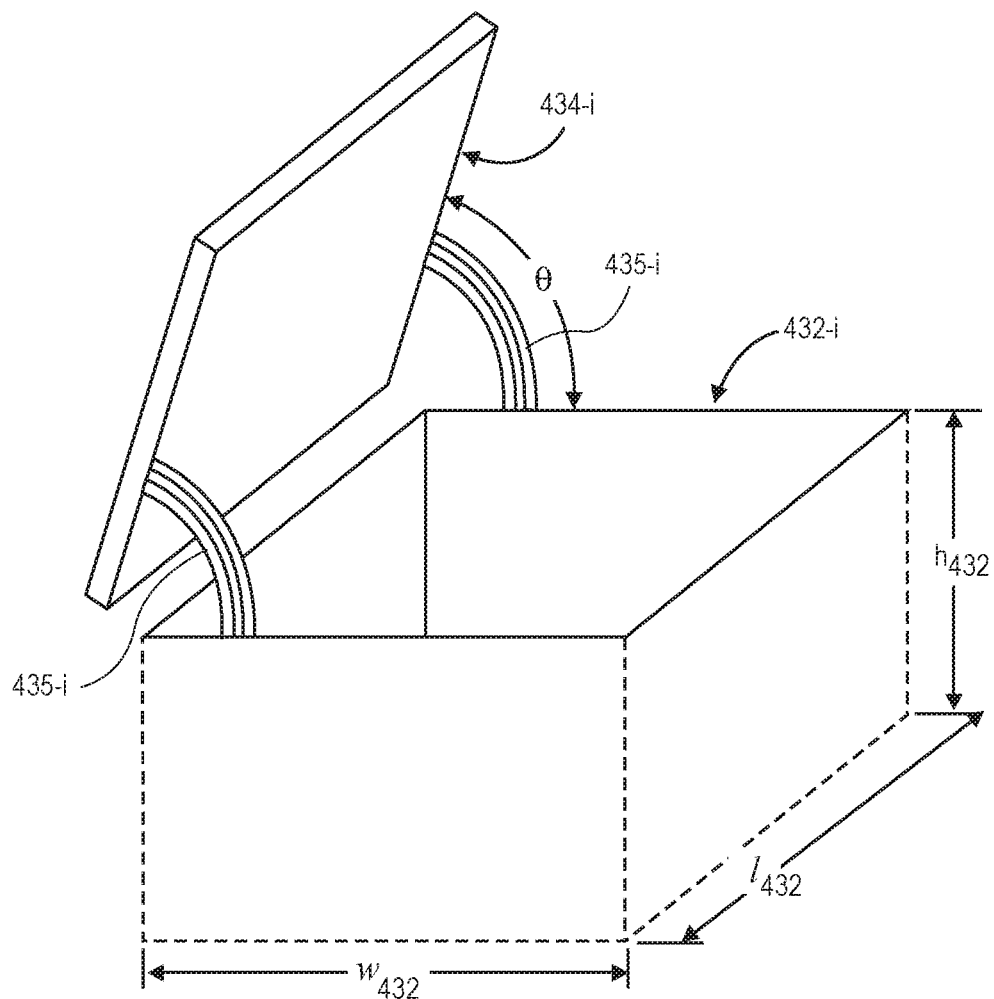
Figure 4C:
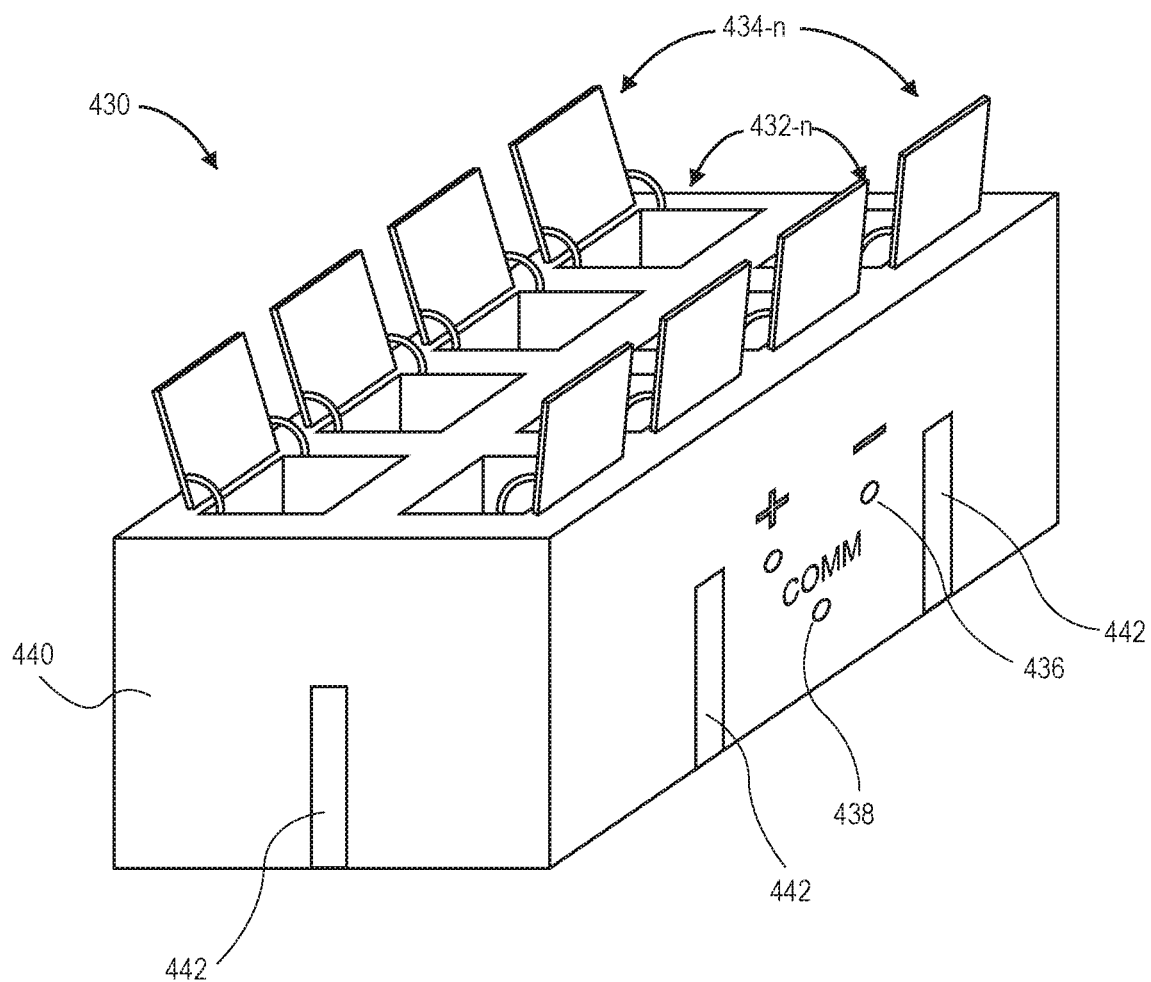

Referring to FIGS. 4A through 4C, views of one modular unit for use in an aerial vehicle in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1H.

As is shown in FIG. 4A, a modular unit 430 includes a frame 440 having n bays 432-$n$ arranged in a columns and b rows. Each of the bays 432-$n$ is accessible via one panel of the frame 440 by one of a plurality of hatches 434-$n$. Additionally, the frame 440 further includes a plurality of indents (or holes or openings) 442, as well as one or more power connectors 436 and one or more communications connectors 438, on one or more other panels of the frame 440.

As is also shown in FIG. 4A, the frame 440 has a length $l_{440}$, a width $w_{440}$, a height $h_{440}$. The modular unit 430 may be configured for installation within a cavity or other opening of an aerial vehicle (not shown) that may accommodate the length $l_{440}$, the width $w_{440}$, and the height $h_{440}$ of the frame 440. Moreover, the aerial vehicle may include one or more latches, hooks or other mechanical systems for releasably engaging the frame 440 by the indents 442, or any electronic or magnetic (e.g., electromagnetic) features for releasably engaging the frame 440 in any other manner. Additionally, when the modular unit 430 is installed within a cavity or other opening of an aerial vehicle, the panel of the frame 440 including the plurality of hatches 434-$n$ will be exposed, thereby enabling the modular unit 430 to release or deploy any items within any of the bays 432-$n$ at or above an intended destination. Likewise, when the modular unit 430 is installed within a cavity or other opening of an aerial vehicle, the power connectors 436 and one or more communications connectors 438 may mate with any corresponding power connectors or communications connectors within the cavity or other opening, and may receive power from or communicate with the aerial vehicle.

The bays 432-$n$ may have any dimensions in accordance with embodiments of the present disclosure. As is shown in FIG. 4B, a representative one of the bays 432-$i$ is shown with a corresponding hatch 434-$i$ in an intermediate position aligned at an angle θ with respect to a fully closed position, such as in the positions of the hatches 434-$n$ shown in FIG. 4A. The hatch 434-$i$ is movably joined or associated with the bay 432-$i$ by a set of hinges 435-$i$, or in any other manner. Alternatively, the hatch 434-$i$ may be configured to slide, rotate, descend or otherwise move from the fully closed positions of the hatches 434-$n$ shown in FIG. 4A.

As is also shown in FIG. 4B, the bay 432-$i$ has interior dimensions including a length $l_{432}$, a width $w_{432}$, a height $h_{432}$. The bay 432-$i$ may accommodate a single item, or a bundle, a group or a set of items, having dimensions that are not greater than the length $l_{432}$, the width $w_{432}$, or the height $h_{432}$, or may be releasably loaded into the bay 432-$i$, despite such dimensions, e.g., soft or flexible items having one or more dimensions greater than the length $l_{432}$, the width $w_{432}$, or the height $h_{432}$ that may be loaded into the bay 432-$i$ without damaging such items. Moreover, in some embodiments, the bays 432-$n$ of the modular unit 430 shown in FIG. 4A may be homogenous in nature, such that each of the bays 432-$n$ has the length $l_{432}$, the width $w_{432}$, and the height $h_{432}$.

Alternatively, in some embodiments, the bays 432-n of the modular unit 430 shown in FIG. 4A may be heterogeneous in nature, such that one or more of the bays 432-n may have a length, a width or a height that is different than the length $l_{432}$, the width $w_{432}$, or the height $h_{432}$. Moreover, each of the bays 432-n may have a substantially rectangular cross-section, such as is shown in FIGS. 4A and 4B, or a cross-section in a shape other than a rectangle, e.g., a cross-section that is round or otherwise curved, or a cross-section in a shape of a triangle or another polygon.

As is shown in FIG. 4C, the modular unit 430 of FIG. 4A is shown with each of the hatches 434-n in an open position, such that the hatches 434-n enable or do not inhibit access to the bays 432-n, thereby enabling the bays 432-n to be loaded with one or more items. Upon loading the bays 432-n with items, the hatches 434-n may be returned to the closed position, such as is shown in FIG. 4A, and the modular unit 430 may be installed within a cavity or other opening of an aerial vehicle for transport to locations where the items within the bays 432-n are to be delivered.

Figure 5A:
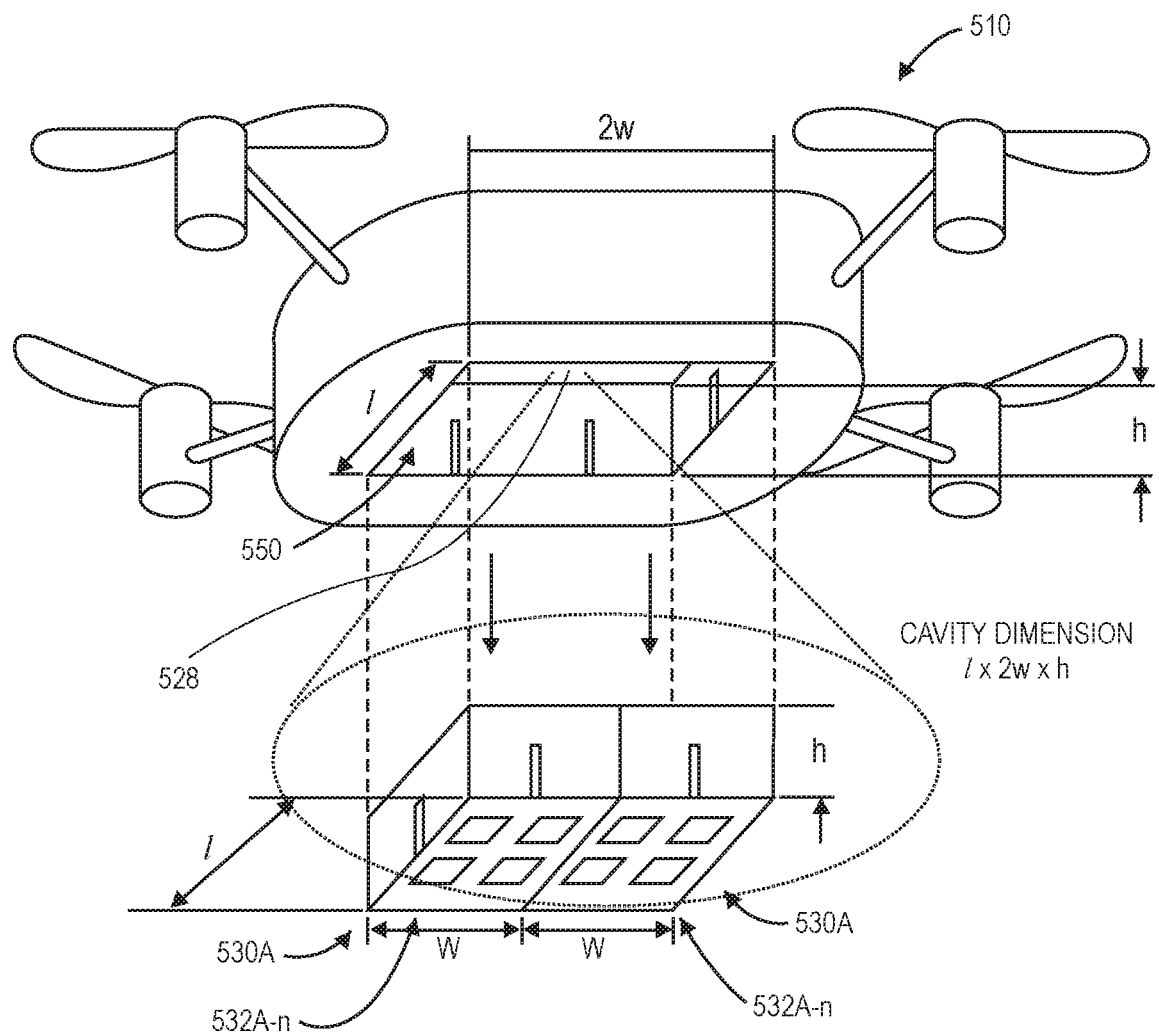
FIGS. 5A and 5B are views of aspects of one system including modular units for use in an aerial vehicle in accordance with embodiments of the present disclosure.
Figure 5B:
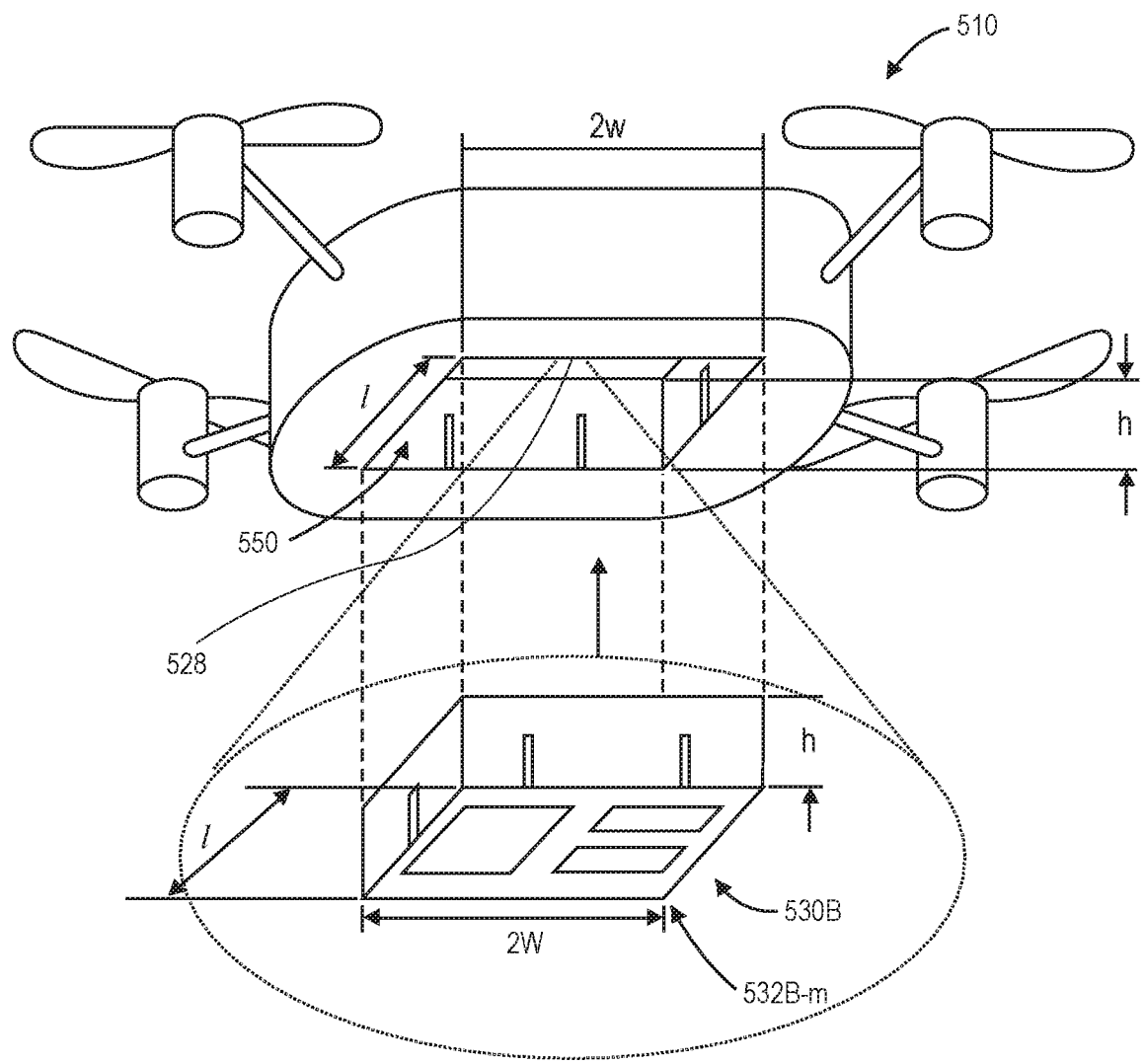

In some embodiments, a cavity or other opening within an aerial vehicle may be sized or configured to receive any number of modular units therein. Referring to FIGS. 5A and 5B, views of aspects of one system including modular units for use in an aerial vehicle in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4C, by the number "2" shown in FIG. 2 or by the number "1" shown in FIGS. 1A through 1H.

As is shown in FIG. 5A, a pair of modular units 530A, each having a length l, a width w and a height h, and a plurality of n bays 532A-n, are removed from a cavity 550 or other opening of an aerial vehicle 510, e.g., after the one or more items within then bays 532A-n have been delivered to various locations. The cavity 550 has a length l, a width 2w, and a height h. As is shown in FIG. 5A, the n bays 532A-n may have the same dimensions or shapes.

Alternatively, in some embodiments, however, two or more of the n bays 532A-n may have different dimensions or shapes. Additionally, a camera 528 provided within the cavity 550 is aligned to detect or monitor the modular units 530A, e.g., during their installation into the cavity 550 or their removal from the cavity 550. Alternatively, the cavity 550 may include any number of other sensors for capturing data regarding modular units during their installation or removal.

As is shown in FIG. 5B, after the pair of modular units 530A are removed from the cavity 550 of the aerial vehicle 510, a modular unit 530B having the length l, a width 2w and the height h may be inserted into the cavity 550. The modular unit 530B is substantially twice the size of the modular units 530A, and may thus be accommodated within the opening 550 within which the modular units 530A were previously installed. As is also shown in FIG. 5B, the m bays 532B-m have dimensions or shapes of different sizes. Once the bays 532B-m of the modular unit 530B are loaded with items and the modular unit 530B is installed into the aerial vehicle 510, the aerial vehicle 510 may transport the modular unit 530B to one or more locations where such items are to be delivered, and subsequently be removed and/or reloaded for reinstallation into the cavity 550 of the aerial vehicle 510 or a cavity of another aerial vehicle.

Modular units of the present disclosure may be outfitted or equipped with bays or other compartments of any number and of any size or shape, and such bays or compartments may be configured to deliver items or containers of any type. Referring to FIGS. 6A through 6F, views of aspects of systems including modular units for use in aerial vehicles in accordance with embodiments of the present disclosure are shown. Except where otherwise noted, reference numerals preceded by the number "6" shown in FIGS. 6A through 6F indicate components or features that are similar to components or features having reference numerals preceded by the number "5" shown in FIGS. 5A and 5B, by the number "4" shown in FIGS. 4A through 4C, by the number "2" shown in FIG. 2 or by the number "1" shown in FIGS. 1A through 1H.

Figure 6A:
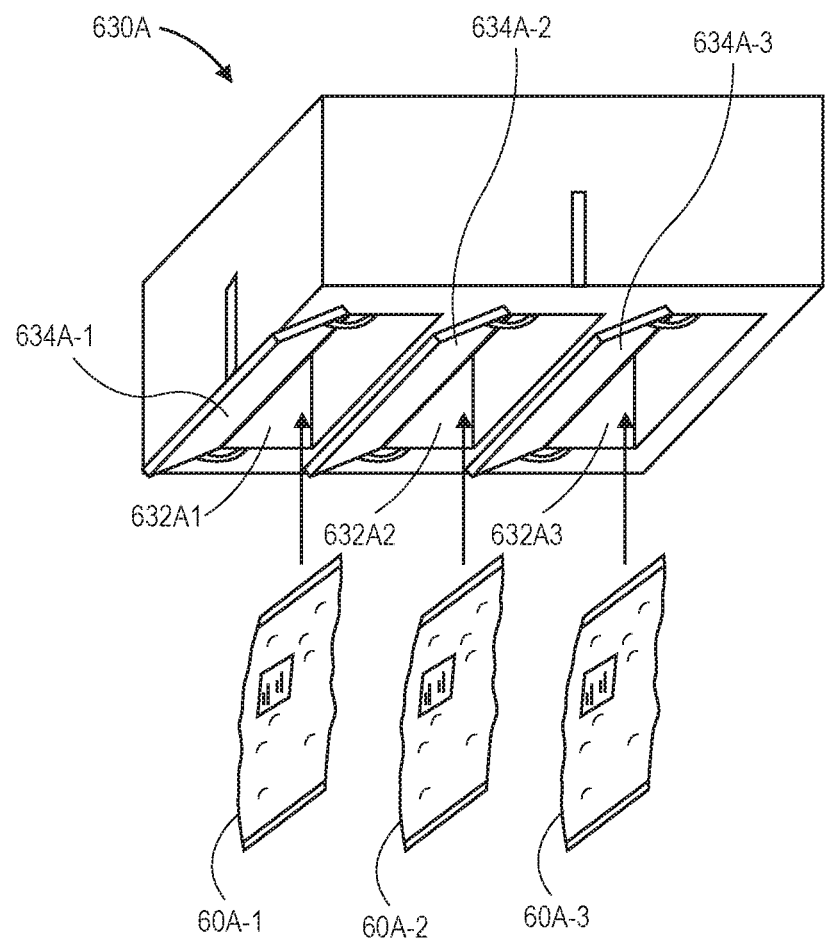
FIGS. 6A through 6F are views of aspects of systems including modular units for use in aerial vehicles in accordance with embodiments of the present disclosure.

As is shown in FIG. 6A, a modular unit 630A includes a plurality of bays 632A-1, 632A-2, 632A-3 that are aligned in parallel with one another. Each of the bays 632A-1, 632A-2, 632A-3 has one of a plurality of hatches 634A-1, 634A-2, 634A-3 and common internal dimensions, including lengths that are substantially greater than their respective widths. As is also shown in FIG. 6A, each of the bays 632A-1, 632A-2, 632A-3 is loaded with one of a plurality of containers 60A-1, 60A-2, 60A-3, e.g., padded envelopes including one or more items therein.

Figure 6B:
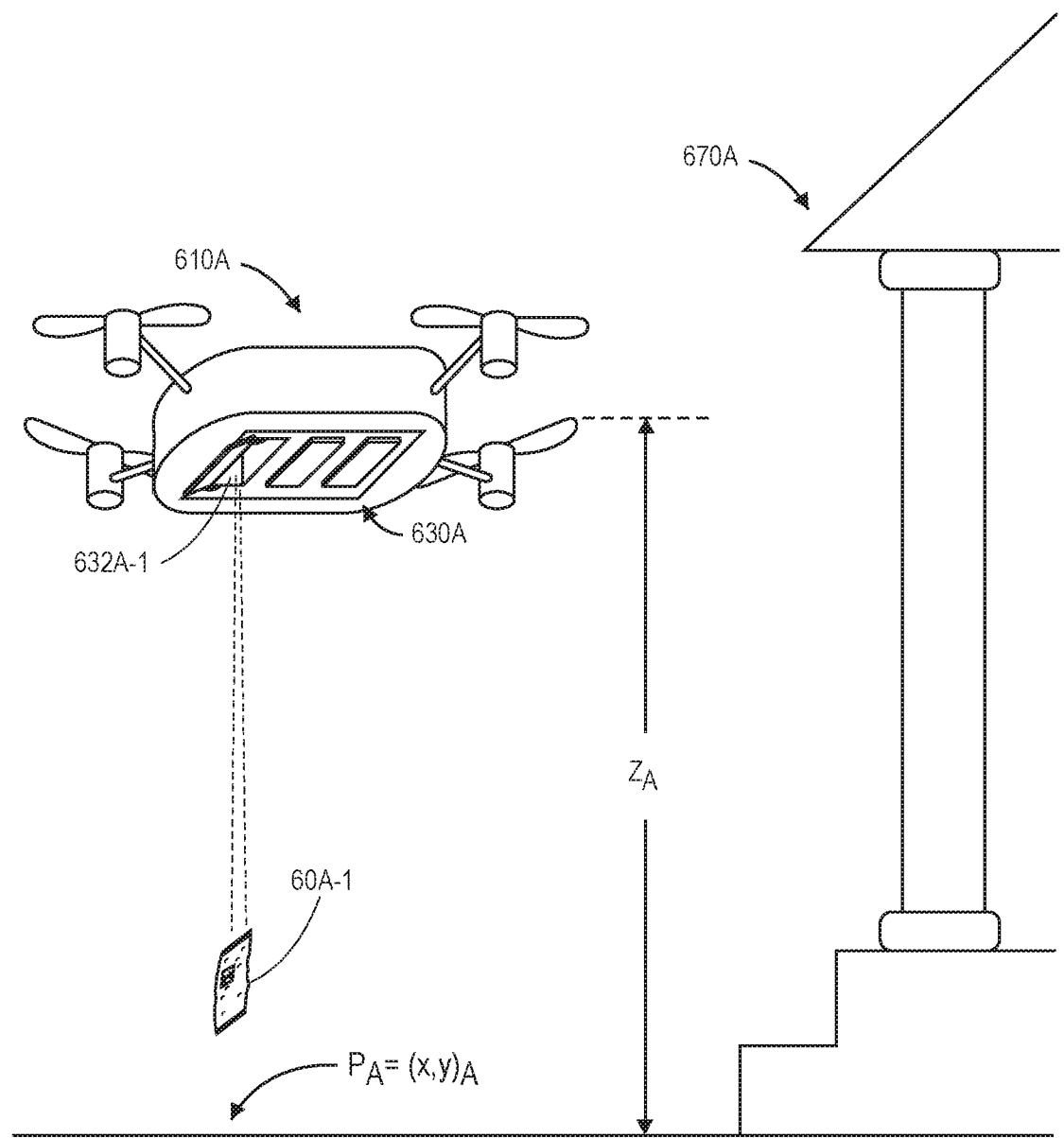

As is shown in FIG. 6B, after the modular unit 630A has been loaded with the containers 60A-1, 60A-2, 60A-3 of items, the modular unit 630A may be installed into an aerial vehicle 610A and transported to a location 670A associated with a delivery of one of the containers 60A-1, e.g., a home, an office, or any other structure, facility or location. The aerial vehicle 610A may release the container 60A-1 when the aerial vehicle 610A is located at a predetermined or selected altitude $z_A$ above a position PA, defined by coordinates $(x, y)_A$, at or near the location 670A. Alternatively, the aerial vehicle 610A may be instructed to land at or near the position PA prior to releasing the container 60A-1. Upon releasing the container 60A-1, the aerial vehicle 610A may ascend and travel to a location associated with either of the containers 60A-2, 60A-3, or to any other location.

Figure 6C:
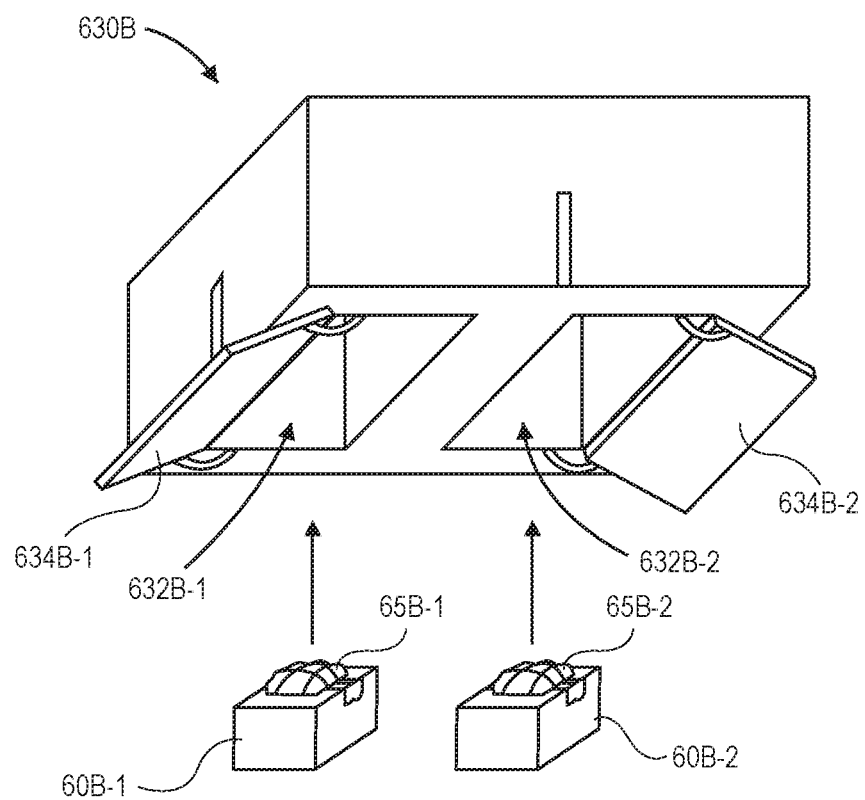

As is shown in FIG. 6C, a modular unit 630B includes a pair of bays 632B-1, 632B-2, each having one of a pair of hatches 634B-1, 634B-2. Each of the bays 632B-1, 632B-2 has common internal dimensions, including lengths and widths that are substantially equal to one another, such that the bays 632B-1, 632B-2 have substantially square cross-sections. As is also shown in FIG. 6C, each of the bays 632B-1, 632B-2 is loaded with one of a pair of boxes 60B-1, 60B-2 or other systems containing one or more items. Each of the boxes 60B-1, 60B-2 has a parachute 65B-1, 65B-2 for increasing an amount of drag of one of the boxes 60B-1, 60B-2 during a descent. The parachutes 65B-1, 65B-2 are compacted or packed and joined to the boxes 60B-1, 60B-2 prior to loading the boxes 60B-1, 60B-2 into the bays 632B-1, 632B-2.

Figure 6D:
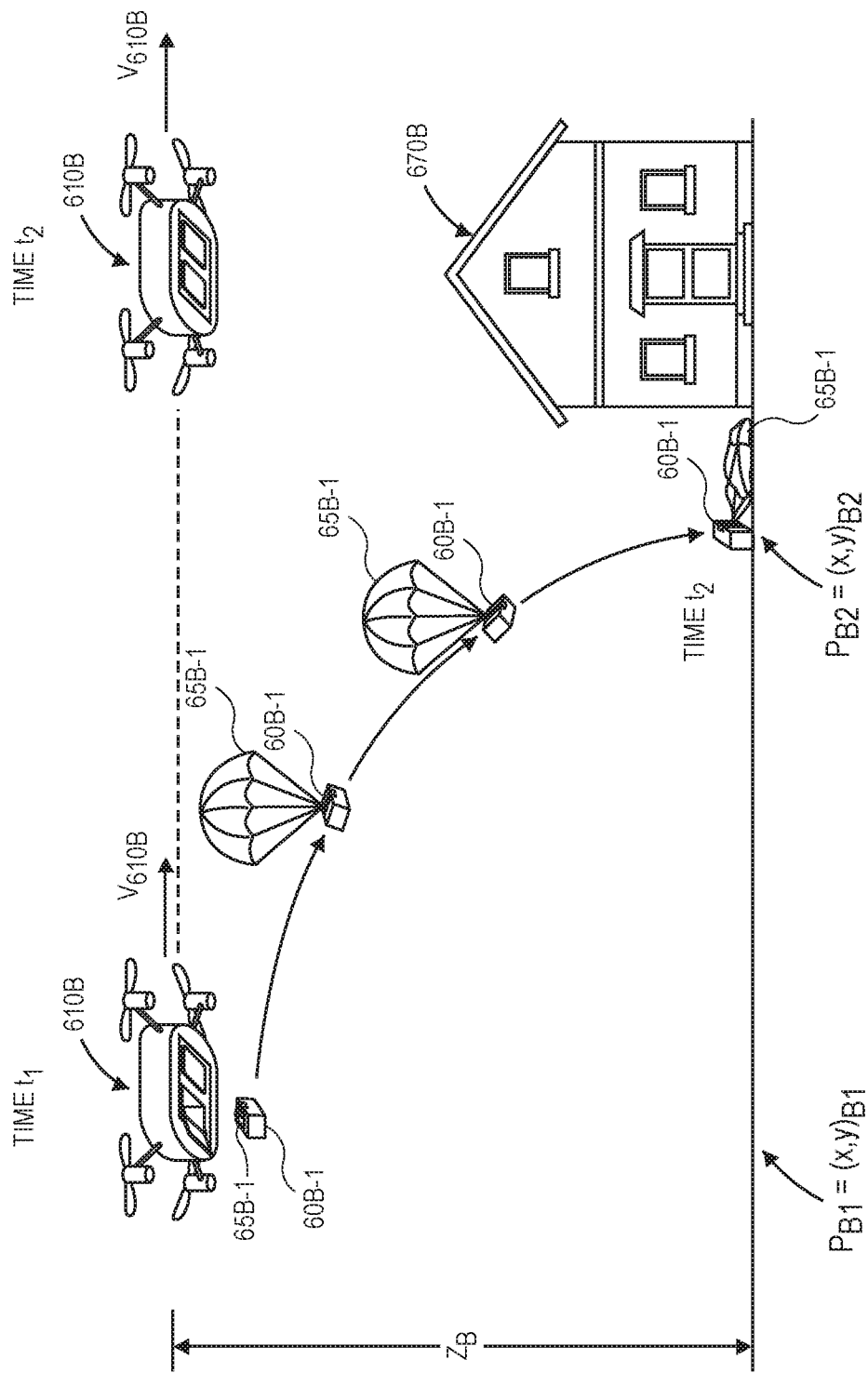

As is shown in FIG. 6D, after the modular unit 630B has been loaded with the boxes 60B-1, 60B-2, the modular unit 630B may be installed into an aerial vehicle 610B and caused to travel on a route that passes over or near a location 670B associated with a delivery of one of the boxes 60B-1. For example, with the aerial vehicle 610B traveling at a velocity $V_B$ and an altitude $z_B$, the aerial vehicle 610B may calculate a time $t_1$ at which the box 60B-1 should be released, or a position $P_{B1}$ defined by coordinates $(x, y)_{B1}$ over which the box 60B-1 should be released, in order to cause the box 60B-1 to descend to and land at or near a position $P_{B2}$ defined by coordinates $(x, y)_{B2}$ that is associated with the location 670B at time $t_2$. The position $P_{B1}$ and/or the time $t_1$ may be calculated based on the velocity $V_B$, the altitude $z_B$, and any other relevant factors, including but not limited to winds or other environmental factors, a distance or buffer between the position $P_{B2}$ and the location 670B, ground materials or conditions at the position $P_{B2}$, air or ground traffic at the altitude $z_B$ or near the position $P_{B2}$, or any other factors. As is shown in FIG. 6D, shortly after the box 60B-1 is released, the parachute 65B-1 is deployed from the box 60B-1, allowing the box 60B-1 to descend at a controlled, safe rate.

Figure 6E:
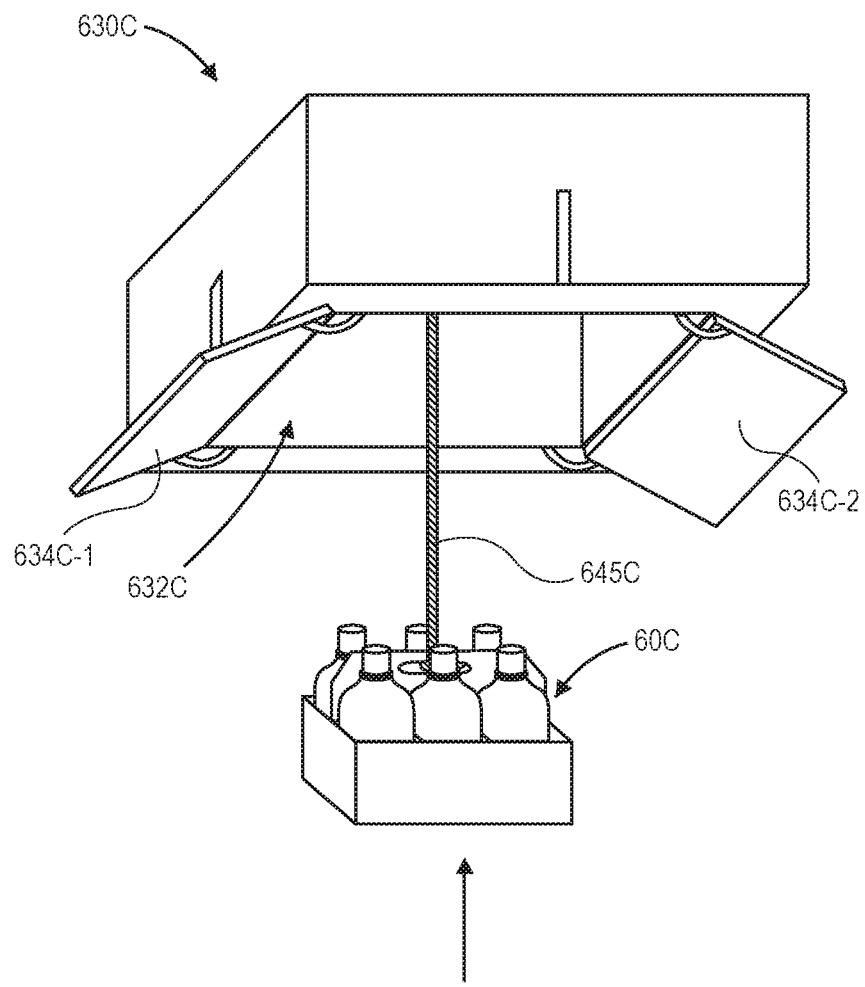

As is shown in FIG. 6E, a modular unit 630C includes a single bay 632C having a pair of hatches 634C-1, 634C-2 that are configured to rotate away from one another in order to open and expose the bay 632C, or to rotate toward one another in order to close and isolate the bay 632C. The modular unit 630C further includes a tether 645C that may be extended from or retracted into the bay 632C. As is shown in FIG. 6E, an end of the tether 645C may be coupled to a set of items 60C (e.g., a pack of soda bottles) and retracted into the bay 632C, to load the set of items 60C therein. Once the set of items 60C has been received within the bay 632C, the hatches 634C-1, 634C-2 may be operated to secure the set of items 60C therein.

Figure 6F:
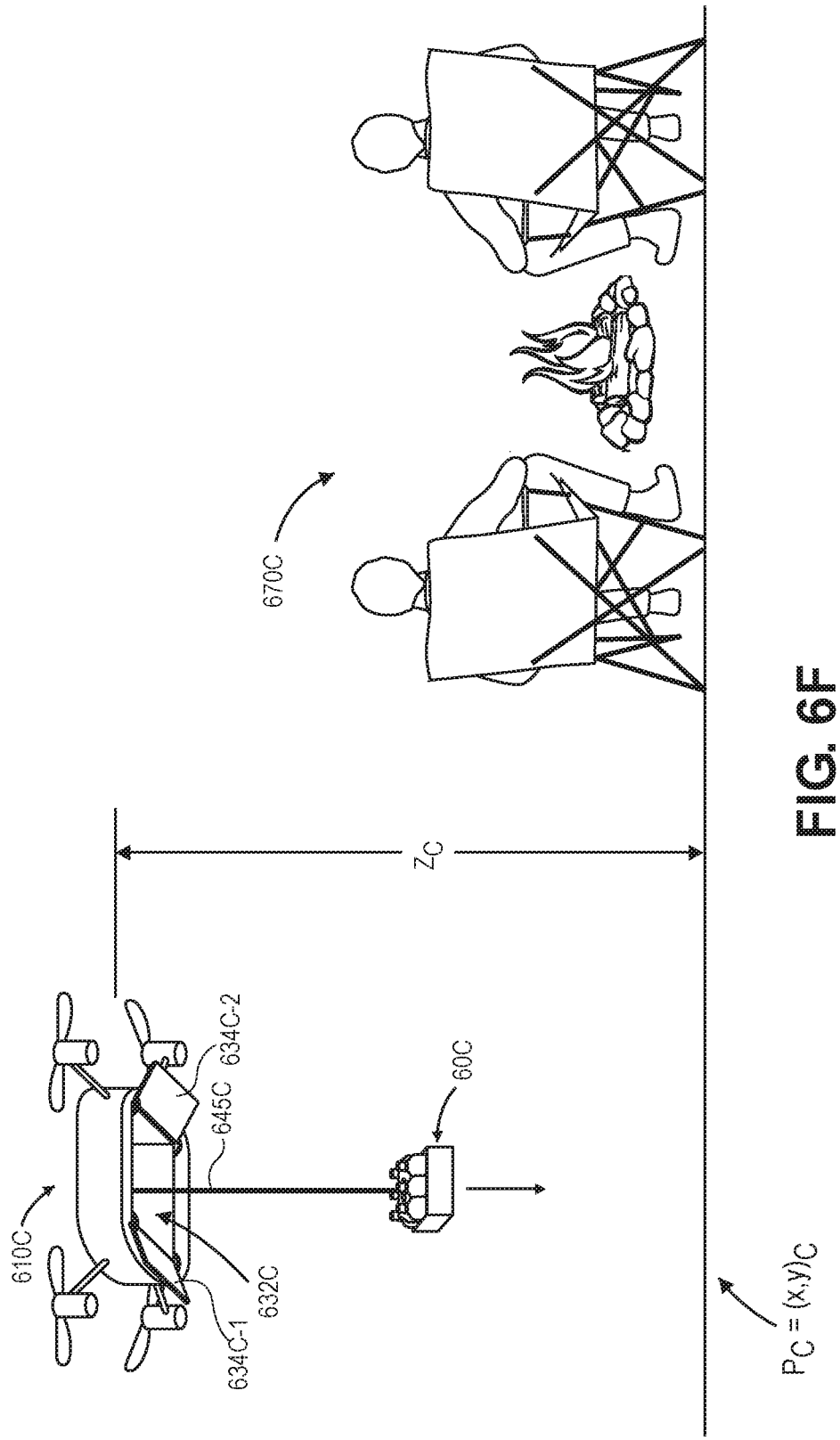

As is shown in FIG. 6F, after the modular unit 630C has been loaded with the set of items 60C, the modular unit 630C may be installed into an aerial vehicle 610C and transported to a location 670C associated with a delivery of the set of items 60C, e.g., an outdoor gathering. As is also shown in FIG. 6F, the aerial vehicle 610C may operate the hatches 634C-1, 634C-2 to expose the bay 632C, and cause the set of items 60C to descend from the bay 632C via the tether 645C when the aerial vehicle 610C is located at a predetermined or selected altitude $z_C$ above a position $P_C$, defined by coordinates $(x, y)_C$, at or near the location 670C. The altitude $z_C$ may be selected on any basis, including but not limited to one or more structural properties of materials (e.g., bottles) associated with the set of items 60C, such as strengths of the materials in tension, compression, shear or any other properties. Alternatively, the aerial vehicle 610C may be instructed to land at or near the position $P_C$ prior to releasing the set of items 60C. Once the set of items 60C has been deposited on a ground surface at or near the position $P_C$, the aerial vehicle 610C may ascend and travel to another location.

Figure 7B:
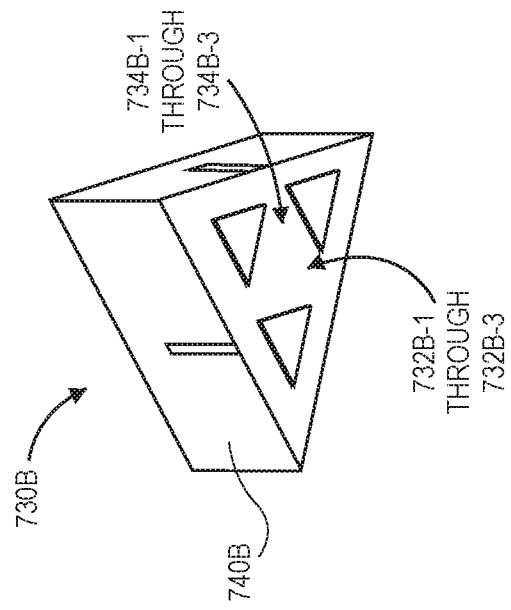
FIGS. 7A and 7B are views of modular units for use in aerial vehicles in accordance with embodiments of the present disclosure.
Figure 7A:
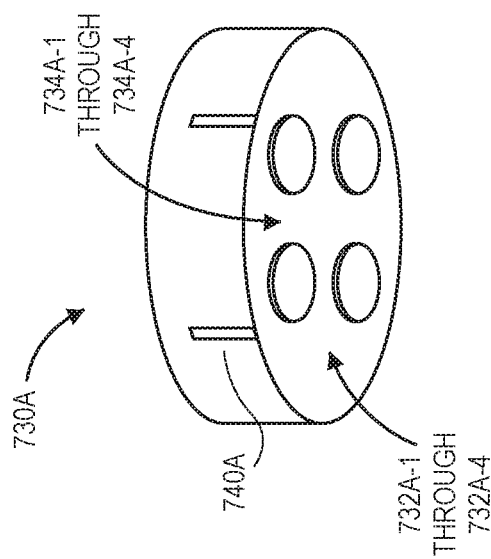

The modular units of the present disclosure may have any shape, including not only substantially rectangular shapes (e.g., cuboids or parallelepipeds), but also any other three-dimensional shapes. Referring to FIGS. 7A and 7B, views of modular units for use in aerial vehicles in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A through 6F, by the number "5" shown in FIGS. 5A and 5B, by the number "4" shown in FIGS. 4A through 4C, by the number "2" shown in FIG. 2 or by the number "1" shown in FIGS. 1A through 1H.

As is shown in FIG. 7A, a modular unit 730A has a substantially right cylindrical shape. The modular unit 730A includes a plurality of bins 732A-1 through 732A-4 disposed within a frame 740A having a substantially horizontal panel with a plurality of hatches 734A-1 through 734A-4 disposed therein and a circular or otherwise curved cross-section with a cylindrical wall aligned substantially normal to the substantially horizontal panel. Each of the bins 732A-1 through 732A-4 has a substantially circular or otherwise curved cross-section, and each of the hatches 734A-1 through 734A-4 has a circular or correspondingly curved shape. The modular unit 730A may be installed within an opening of an aerial vehicle (not shown) having similarly right cylindrical dimensions and shapes for accommodating the modular unit 730A.

As is shown in FIG. 7B, a modular unit 730B has a shape of a right triangular prism. The modular unit 730B includes a plurality of bins 732B-1 through 732B-3 disposed within a frame 740B having a substantially horizontal panel with a plurality of hatches 734B-1 through 734B-3 disposed therein and a triangular shape, with three walls aligned substantially normal to the substantially horizontal panel. Each of the bins 732B-1 through 732B-3 has a substantially triangular cross-section, and each of the hatches 734B-1 through 7334B-3 has a triangular or other corresponding shape. The modular unit 730B may be installed within an opening of an aerial vehicle (not shown) having a similar shape of a right triangular prism and similar dimensions for accommodating the modular unit 730B.

Those of ordinary skill in the pertinent arts will recognize that shapes of the modular units of the present disclosure are not limited to any of the shapes or dimensions described herein. For example, in some embodiments, modular units may have any number of panels, sections, faces or surfaces that are aligned horizontally, vertically, or at any other angle with respect to one another, or curved, and may have any shape. Such modular units may be installed within openings of aerial vehicles having corresponding dimensions and/or shapes. Moreover, the bays and/or hatches of the present disclosure may have the same or similar shapes as the modular units or cross sections thereof, or different shapes.

Modular units of the present disclosure may be utilized in any manner by large-scale entities such as materials handling facilities, fulfillment centers, warehouses or other like facilities, or by small-scale entities such as manufacturers, merchants, sellers or vendors. In particular, a modular unit may be specifically configured to perform one or more missions, activities or functions on behalf of a manufacturer, a merchant, a seller or a vendor, and programmed with instructions or other information or data regarding such missions, activities or functions. An aerial vehicle that retrieves the modular unit may receive the information or data from the modular unit, and execute the one or more instructions to perform the missions, activities or functions for which the modular unit was intended.

Referring to FIGS. 8A through 8G, views of one system including a modular unit for use in an aerial vehicle in accordance with embodiments of the present disclosure are shown. Except where otherwise noted, reference numerals preceded by the number "8" shown in FIGS. 8A through 8G indicate components or features that are similar to components or features having reference numerals preceded by the number "7" shown in FIGS. 7A and 7B, by the number "6" shown in FIGS. 6A through 6F, by the number "5" shown in FIGS. 5A and 5B, by the number "4" shown in FIGS. 4A through 4C, by the number "2" shown in FIG. 2 or by the number "1" shown in FIGS. 1A through 1H.

Figure 8A:
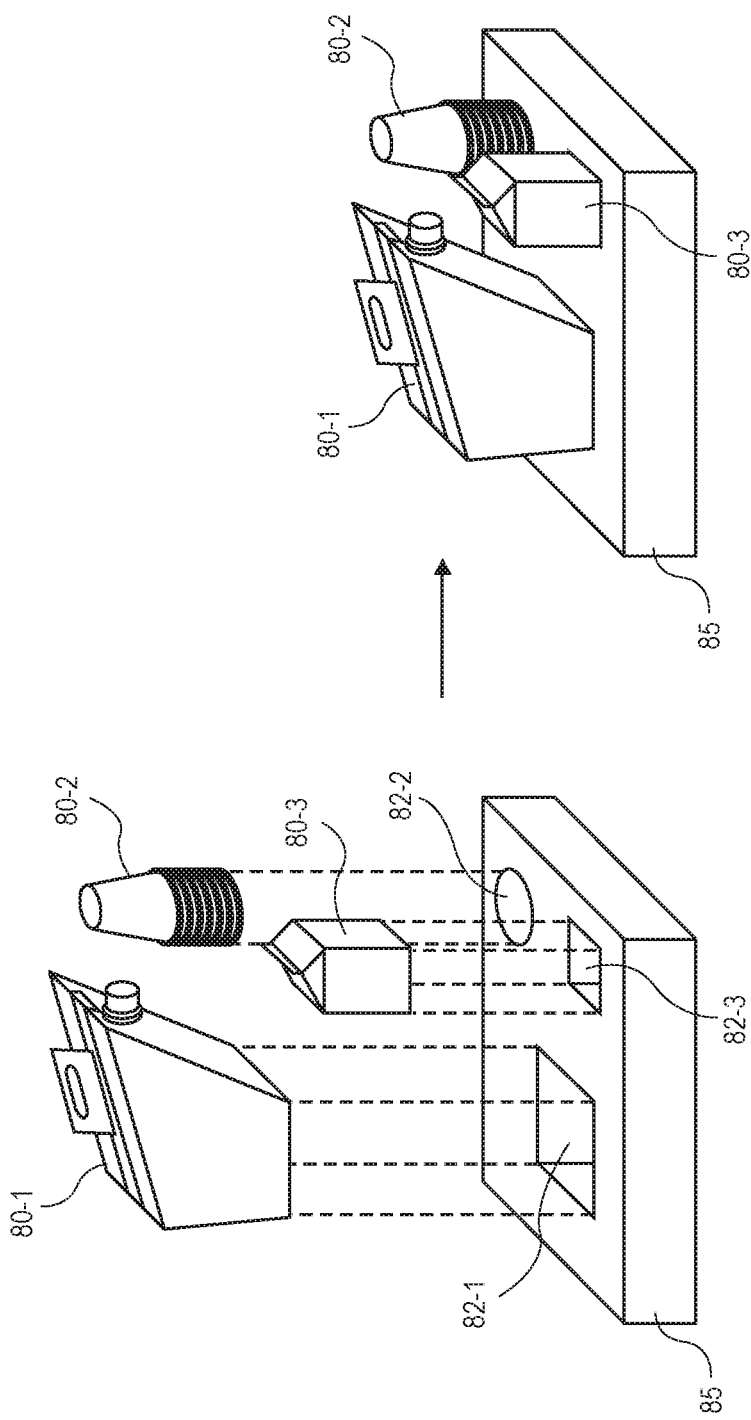

As is shown in FIG. 8A, a plurality of items 80-1, 80-2, 80-3 (e.g., a container for distributing beverages, accessories for consuming the beverages, and optional additions to the beverages) prepared by a merchant for delivery to one or more locations are placed into corresponding openings 82-1, 82-2, 82-3 within a tray 85. Each of the openings 82-1, 82-2, 82-3 within the tray 85 may be sized to accommodate bottom portions of the respective items 80-1, 80-2, 80-3. In some embodiments, the tray 85 may include one or more additional features for maintaining items within the respective openings 82-1, 82-2, 82-3 at or near desired temperatures, or within ranges of pressures, such as hot plates, cold plates, or other systems.

Figure 8B:
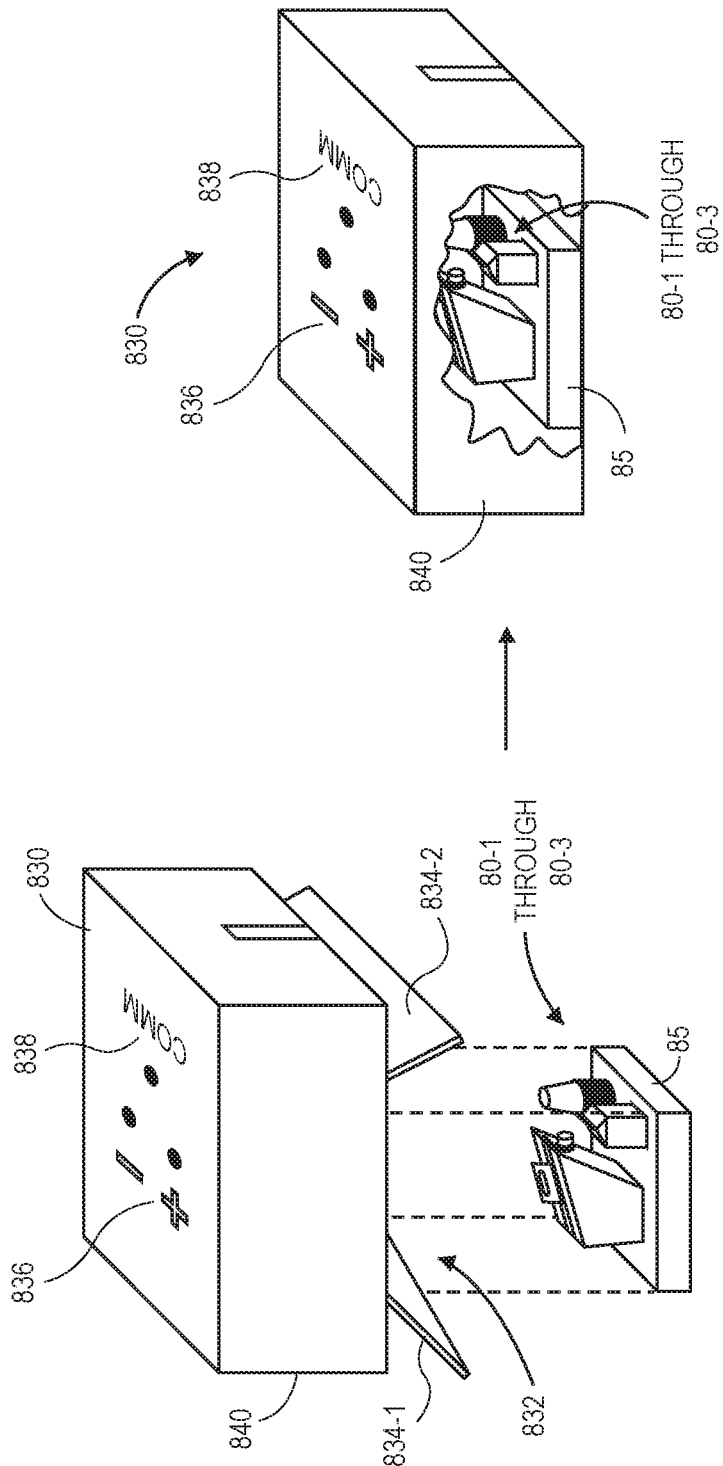

As is shown in FIG. 8B, with the items 80-1, 80-2, 80-3 loaded into the openings 82-1, 82-2, 82-3 of the tray 85, the tray 85 is loaded into a modular unit 830, e.g., manually or automatically. For example, as is shown in FIG. 8B, the modular unit 830 may include a frame 840 with a bay 832 disposed within the frame 840, and a pair of hatches 834-1, 834-2 or other movable coverings on an underside of the frame 840. The hatches 834-1, 834-2 may be rotated from a closed position aligned with a bottom panel or section of the frame 840 to an open position that enables one or more items or other objects, viz., the tray 85, to be loaded therein. Additionally, a top panel or section of the frame 840 includes power connectors 836 or communications connectors 838 for mating with corresponding connectors within an opening 850 of an aerial vehicle. Alternatively, the modular unit 830 may include any number of other bays, which may have the same shapes or dimensions as the bay 832, or other shapes or dimensions. When the tray 85 is loaded into the modular unit 830, the hatches 834-1, 834-2 may be returned to the closed position, aligned with the bottom panel or section of the frame 840.

Figure 8C:
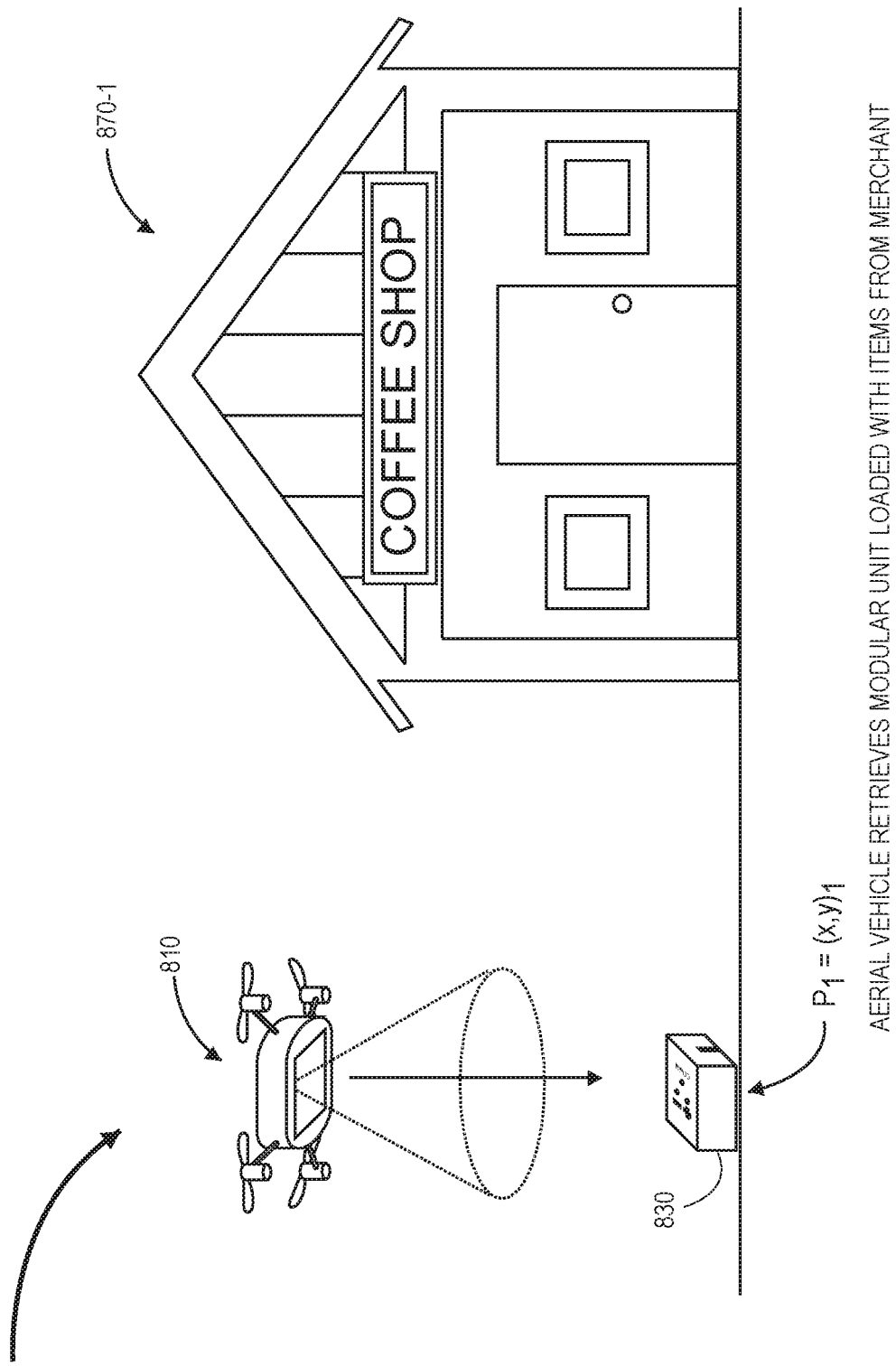

As is shown in FIG. 8C, with the tray 85 loaded into the modular unit 830, an aerial vehicle 810 may be dispatched to travel to a location 870-1 of the merchant that prepared the items 80-1, 80-2, 80-3. For example, the aerial vehicle 810 may receive, or be programmed with, one or more sets of instructions for causing the aerial vehicle 810 to travel on one or more courses, speeds or altitudes to a position $P_1$, defined by coordinates $(x, y)_1$, at or near the location 870-1 of the merchant, and may execute such instructions to operate one or more propulsion motors, control surfaces or other systems and cause the aerial vehicle 810 to travel to the position $P_1$. Upon arriving at or above the position $P_1$, the aerial vehicle 810 may hover over or descend to retrieve the modular unit 830 and the tray 85 with the items 80-1, 80-2, 80-3 therein, either manually (e.g., by one or more workers or other personnel associated with the location 870-1) or automatically, such as by one or more elevator platforms, robotic arms, or other systems. In some embodiments, the aerial vehicle 810 may determine or confirm its arrival within a vicinity of the position $P_1$ using one or more position sensors (e.g., GPS transceivers). In some embodiments, the location 870-1 may include one or more facilities or other systems for accommodating the aerial vehicle 810, such as a landing pad on a ground level (such as is shown in FIG. 8C) or, alternatively, at one or more elevations above the ground level, such as on a roof or other platform associated with the location 870-1.

Additionally, in some embodiments, upon determining or confirming that the aerial vehicle 810 has arrived within a vicinity of the position $P_1$, the aerial vehicle 810 may capture data (e.g., visual images, depth images or other ranging information) using one or more sensors 828, which may be provided within the opening 850 for receiving the modular unit 830 therein, or in any other location on the aerial vehicle 810, and interpret the captured data to aligning or guiding the modular unit 830 into the opening 850.

As is shown in FIG. 8D, after retrieving the modular unit 830, the aerial vehicle 810 may depart from the position $P_1$ with the modular unit 830 and the tray 85 with the items 80-1, 80-2, 80-3 therein. For example, the aerial vehicle 810 may receive, or be programmed with, one or more sets of instructions for causing the aerial vehicle 810 to travel on one or more courses, speeds or altitudes to a position associated with the items 80-1, 80-2, 80-3, e.g., a position specified in an order for the items 80-1, 80-2, 80-3 placed via a network site or a shopping application, by telephone, in person at a bricks-and-mortar retailer, or in any other manner.

Figure 8E:
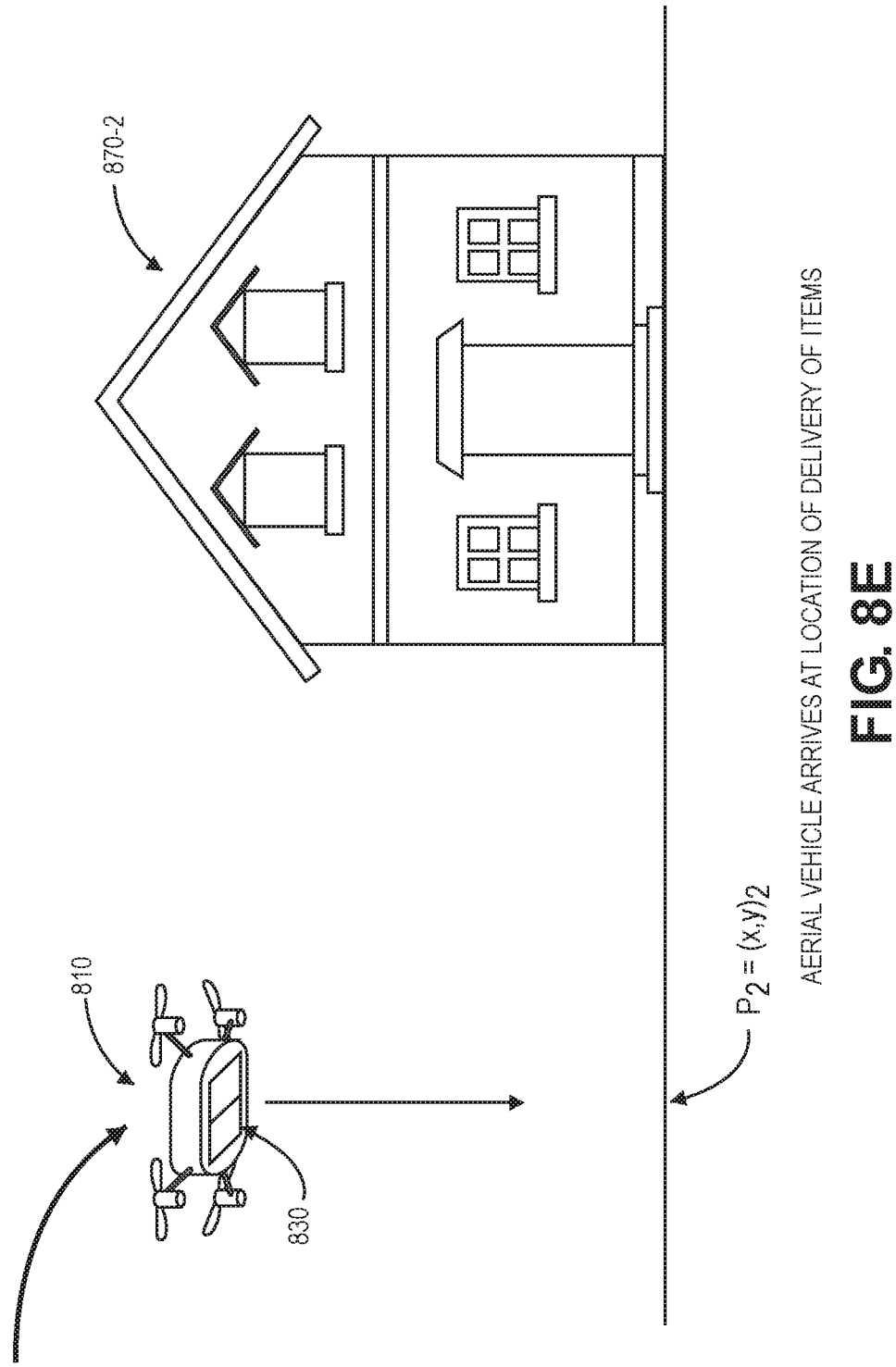

As is shown in FIG. 8E, upon arriving at or above a position $P_2$, defined by coordinates $(x, y)_2$, at or near a location 870-2 of a customer or intended recipient of the items 80-1, 80-2, 80-3, the aerial vehicle 810 may hover over or descend to release the tray 85 with the items 80-1, 80-2, 80-3 therein from the modular unit 830. For example, as is shown in FIG. 8F, the aerial vehicle 810 may land within a vicinity of the position $P_2$, and the tray 85 may be manually (e.g., by the customer or intended recipient of the items 80-1, 80-2, 80-3) or automatically (e.g., by one or more tethers or other systems) released from the modular unit 830. Alternatively, the tray 85 or the items 80-1, 80-2, 80-3 may be released or otherwise removed from the modular unit 830 in any other manner.

Figure 8G:
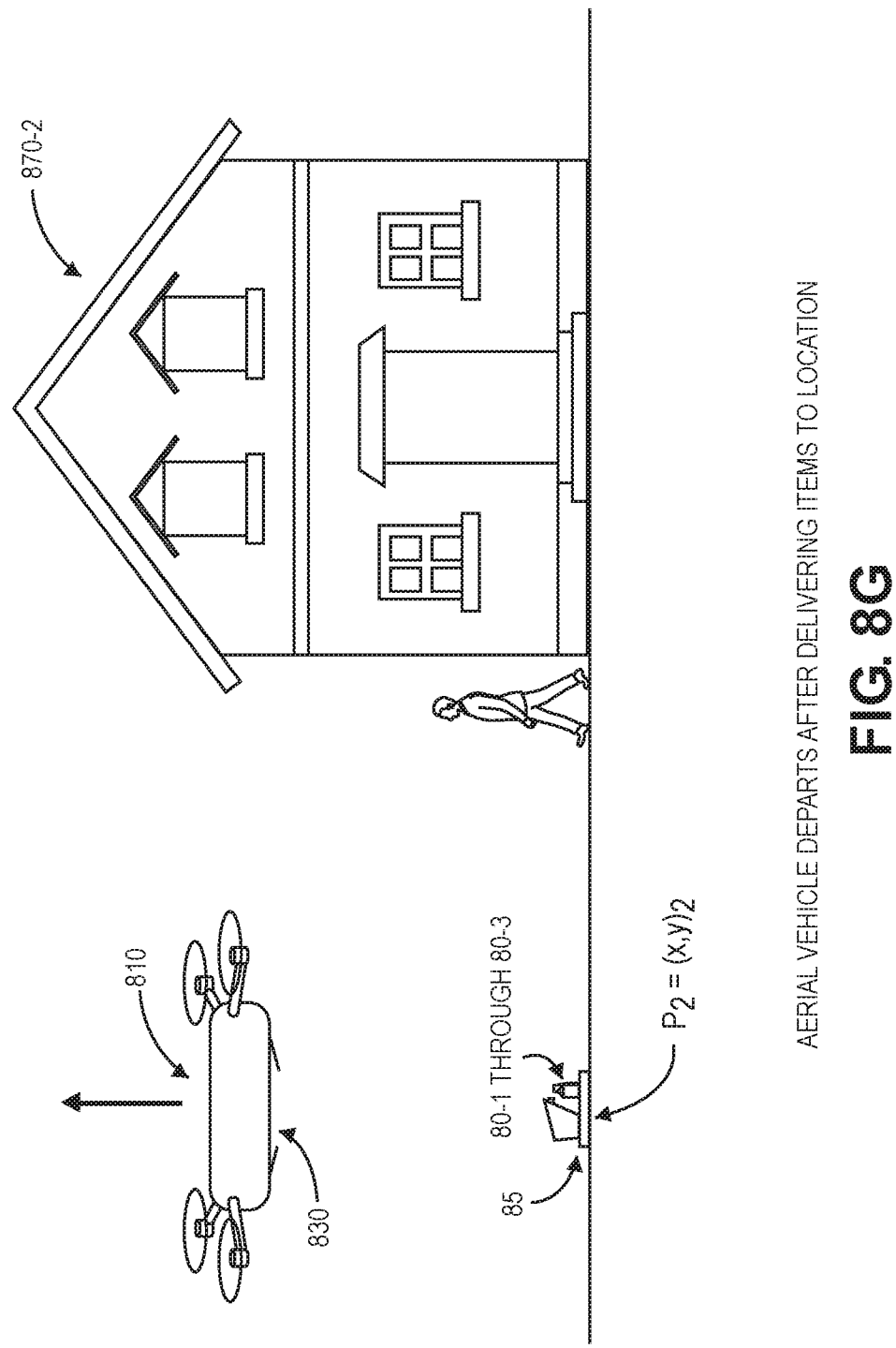

As is shown in FIG. 8G, upon releasing the tray 85 and the items 80-1, 80-2, 80-3 at or near the position $P_2$, the aerial vehicle 810 may depart from the position $P_2$ with the modular unit 830 therein. For example, the aerial vehicle 810 may receive, or be programmed with, one or more sets of instructions for causing the aerial vehicle 810 to travel on one or more courses, speeds or altitudes to return to the position $P_1$ associated with the location 870-1, or to any other positions or locations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the use of unmanned aerial vehicles to deliver payloads from materials handling facilities, fulfillment centers, warehouses or other like facilities to customers, those of ordinary skill in the pertinent arts will recognize that the systems and methods disclosed herein are not so limited, and may be utilized in connection with any type or form of object or vehicle (e.g., manned or unmanned) or component thereof that is configured for any intended industrial, commercial, recreational or other use. Likewise, the systems and methods of the present disclosure are not limited to any of the specific embodiments of modular units or vehicles described herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
   a body;
   at least a first propulsion motor and a second propulsion motor coupled to the body;
   an opening provided on an underside of the body, wherein the opening is a rectangular cavity having a bottom section and a plurality of side panels joined to the bottom section of the opening;
   a modular unit installed within the opening, wherein the modular unit comprises a frame, a plurality of bays disposed within the frame, and a plurality of coverings, wherein each of the coverings is movable between at least an open position and a closed position, and wherein each of the plurality of bays has at least one item loaded therein; and
   a control system in communication with the first propulsion motor, the second propulsion motor, and the modular unit,
   wherein the control system comprises at least one processor and at least one memory component programmed with one or more sets of instructions that, when executed by the at least one processor, cause the at least one processor to at least:
   receive a first set of instructions for traveling to a first location associated with a first item disposed within a first bay of the plurality of bays and a second location associated with a second item disposed within a second bay of the plurality of bays;
   operate at least the first propulsion motor and the second propulsion motor to cause the aerial vehicle to travel to the first location;
   determine that the aerial vehicle is located within a vicinity of the first location;
   in response to determining that the aerial vehicle is located within the vicinity of the first location,
      cause a first covering of the first bay to move from a closed position to an open position, wherein the first item is released from the first bay with the first covering in the open position;
   determine that the first item is released from the first bay;
   in response to determining that the first item is released from the first bay,
      cause the first covering to move from the open position to the closed position; after causing the first covering to move from the open position to the closed position,
      operate at least the first propulsion motor and the second propulsion motor to cause the aerial vehicle to travel to the second location;
   determine that the aerial vehicle is located within a vicinity of the second location;
   in response to determining that the aerial vehicle is located within the vicinity of the second location,
      cause a second covering of the second bay to move from a closed position to an open position, wherein the second item is released from the second bay with the second covering in the open position;
   determine that the second item is released from the second bay;
   in response to determining that the second item is released from the second bay,
      cause the second covering to move from the open position to the closed position; and
   after causing the second covering to move from the open position to the closed position,
      operate at least the first propulsion motor and the second propulsion motor to cause the aerial vehicle to travel to a third location.

2. The aerial vehicle of claim 1, wherein the frame has a substantially rectangular shape defined by a top section, a bottom section, a first side section, a second side section, a third side section and a fourth side section,
   wherein the top section is parallel to the bottom section of the frame,
   wherein each of the first side section, the second side section, the third side section and the fourth side section is joined to one edge of the top section of the frame and one edge of the bottom section of the frame, wherein the top section of the frame is in contact with the bottom section of the opening with the modular unit installed within the opening, wherein each of the plurality of coverings is provided in association with the bottom section of the frame, wherein the frame is formed from one or more of a plastic, a composite material or a machined aluminum, wherein a cross-sectional area of each of the top section of the frame and the bottom section of the frame corresponds to a cross-sectional area of the bottom section of the opening, and wherein a height of each of the first side section, the second side section, the third side section and the fourth side section corresponds to a height of each of the plurality of side sections of the opening.

3. A method comprising:

loading at least a first item into a first bay of a first modular unit, wherein the first modular unit comprises a first plurality of bays disposed within a first frame, wherein the first frame comprises a first base and at least a first side extending normal to the first base, wherein each of the first plurality of bays is accessible by way of one of a first plurality of movable coverings in the first base, and wherein the first bay is one of the first plurality of bays;

loading at least a second item into a second bay of the first modular unit, wherein the second bay is one of the first plurality of bays;

causing the first modular unit to be installed within a first opening of a first unmanned aerial vehicle, wherein a cross-sectional area of the first opening corresponds to a cross-sectional area of the first base, wherein a shape of the first opening corresponds to a shape of the first base, and wherein a height of the first opening corresponds to a height of the first side;

transporting, by the first unmanned aerial vehicle, the first modular unit to a first location associated with the first item;

releasing, by the first unmanned aerial vehicle, the first item from the first bay within a vicinity of the first location;

transporting, by the first unmanned aerial vehicle, the modular unit to a second location associated with the second item; and releasing, by the first unmanned aerial vehicle, the second item from the second bay within a vicinity of the second location.

4. The method of claim 3, wherein a centroid of the cross-sectional area of the first base is coaligned with a center of gravity of the first unmanned aerial vehicle.

5. The method of claim 3, wherein the first frame is formed from one or more of a plastic, a composite material or a machined aluminum.

6. The method of claim 3, wherein the first unmanned aerial vehicle is one of a class of unmanned aerial vehicles, and wherein each of the class of unmanned aerial vehicles comprises an opening having a cross-sectional area corresponding to the cross-sectional area of the first base, a shape corresponding to the shape of the first base, and a height corresponding to the height of the first side.

7. The method of claim 3, wherein at least one surface within the first opening comprises at least one of:

a first connector in communication with a power source of the unmanned aerial vehicle; or a second connector in communication with a control system of the unmanned aerial vehicle, wherein the first base or the first side comprises:

a third connector in communication with at least a first movable covering of the first bay and a second movable covering of the second bay, and wherein the third connector is aligned to contact one of the first connector or the second connector when the first modular unit is installed within the opening.

8. The method of claim 3, further comprising:

causing the first modular unit to be removed from the first opening of the first unmanned aerial vehicle;

loading at least a third item into the first bay of the first modular unit;

loading at least a fourth item into the second bay of the first modular unit;

causing the first modular unit to be installed within a second opening of a second unmanned aerial vehicle, wherein a cross-sectional area of the second opening corresponds to a cross-sectional area of the first base, wherein a shape of the second opening corresponds to a shape of the first base, and wherein a height of the second opening corresponds to a height of the first side;

transporting, by the second unmanned aerial vehicle, the first modular unit to a third location associated with the third item; and releasing, from the first modular unit, the third item from the first bay within a vicinity of the third location.

9. The method of claim 3, further comprising:

causing the first modular unit to be removed from the first opening of the first unmanned aerial vehicle;

causing a second modular unit to be installed within the first opening, wherein the second modular unit is configured for use in one or more missions of a type;

transporting, by the first unmanned aerial vehicle, the second modular unit to a third location associated with a mission of the type; and executing, by at least one of the second modular unit or the first unmanned aerial vehicle, the mission of the type within a vicinity of the third location.

10. The method of claim 9, further comprising:

loading at least a third item into a third bay of the second modular unit, wherein the second modular unit comprises a second plurality of bays disposed within a second frame, wherein the second frame comprises a second base and at least a second side extending normal to the second base, wherein each of the second plurality of bays is accessible by way of one of a second plurality of movable coverings in the second base, and wherein the third bay is one of the second plurality of bays; and loading at least a fourth item into a fourth bay of the second modular unit, wherein the fourth bay is one of the second plurality of bays, wherein the second modular unit is caused to be installed within the first opening after at least the third item has been loaded into the third bay and at least the fourth item has been loaded into the fourth bay, and wherein executing the mission of the type by at least one of the second modular unit or the first unmanned aerial vehicle comprises:

releasing, by the first unmanned aerial vehicle, the third item from the third bay within a vicinity of the third location.

11. The method of claim 10, wherein the second modular unit comprises at least one of an imaging device or a wireless transceiver.

12. The method of claim 9, wherein a first number of the first plurality of bays disposed within the first frame is not equal to a second number of the second plurality of bays disposed within the second frame, and
  wherein at least one dimension of one of the first bay or the second bay is not equal to at least one dimension of one of the third bay or the fourth bay.

13. The method of claim 3, further comprising:
  causing the first modular unit to be removed from the first opening of the first unmanned aerial vehicle;
  causing a second modular unit installed within the first opening, wherein the second modular unit comprises a second plurality of bays disposed within a second frame, wherein the second frame comprises a second base and at least a second side extending normal to the second base, and wherein each of the second plurality of bays is accessible by way of one of a second plurality of movable coverings in the second base; and
  causing a third modular unit to be installed within the first opening, wherein the third modular unit comprises a third plurality of bays disposed within a third frame, wherein the third frame comprises a third base and at least a third side extending normal to the third base, wherein each of the third plurality of bays is accessible by way of one of a third plurality of movable coverings in the third base,
  wherein the third modular unit is installed adjacent to the second modular unit within the first opening, and
  wherein a sum of a cross-sectional area of the second base and a cross-sectional area of the third base corresponds to the cross-sectional area of the first base.

14. The method of claim 3, wherein the cross-sectional area of the first opening is approximately nine inches by sixteen inches, and wherein the height of the first side is approximately six inches.

15. The method of claim 3, wherein loading at least the first item into the first bay of the first modular unit comprises:
  coupling a first end of the first tether to the first item, wherein a second end of the first tether is coupled to at least one surface within the first bay, and
  wherein releasing the first item from the first bay within the vicinity of the first location comprises:
    decoupling one of the first end from the at least one surface within the first bay or the second end from the first item.

16. The method of claim 3, wherein the first modular unit comprises at least one temperature control system for maintaining a temperature within at least the first bay at a predetermined level, within a predetermined range, or above or below a predetermined set point.

17. The method of claim 3, further comprising:
  receiving, by at least one server associated with an electronic marketplace, a first order for at least the first item, wherein the first order identifies at least the first item and the first location; and
  receiving, by the at least one server, a second order for at least the second item, wherein the second order identifies at least the second item and the second location,
  wherein at least the second item is loaded into the second bay at the materials handling facility after receiving the first order and the second order.

18. The method of claim 3, wherein the first modular unit further comprises at least a first memory component having first information stored thereon,
  wherein the first information identifies the first location, and
  wherein the method further comprises:
    determining, by the first unmanned aerial vehicle, coordinates of the first location based at least in part on the first information.

\* \* \* \* \*